(12) United States Patent
Wei et al.

(10) Patent No.: US 12,365,153 B2
(45) Date of Patent: *Jul. 22, 2025

(54) METHOD FOR REPAIRING OR RECYCLING AN ELASTOMERIC FILM

(71) Applicant: Synthomer Sdn. Bhd., Johor Darul Takzim (MY)

(72) Inventors: Zhenli Wei, Johor Darul Takzim (MY); Yi-Fan Goh, Johor Darul Takzim (MY)

(73) Assignee: Synthomer Sdn. Bhd., Johor Darul Takzim (MY)

( * ) Notice: Subject to any disclaimer, the term of this patent is extended or adjusted under 35 U.S.C. 154(b) by 570 days.

This patent is subject to a terminal disclaimer.

(21) Appl. No.: 17/610,039

(22) PCT Filed: May 17, 2019

(86) PCT No.: PCT/MY2019/000017
§ 371 (c)(1),
(2) Date: Nov. 9, 2021

(87) PCT Pub. No.: WO2020/235988
PCT Pub. Date: Nov. 26, 2020

(65) Prior Publication Data
US 2022/0194033 A1 Jun. 23, 2022

(51) Int. Cl.
*B29C 73/16* (2006.01)
*B29B 17/04* (2006.01)
(Continued)

(52) U.S. Cl.
CPC .............. *B29C 73/16* (2013.01); *B29B 17/04* (2013.01); *B29C 41/14* (2013.01); *B29C 71/02* (2013.01);
(Continued)

(58) Field of Classification Search
CPC ......... B29C 73/16; B29C 41/14; B29C 71/02; B29C 73/34; B29C 2071/022;
(Continued)

(56) References Cited

U.S. PATENT DOCUMENTS 5,750,618 A 5/1998 Vogt et al.
10,023,728 B2 7/2018 Cha et al.
(Continued)

FOREIGN PATENT DOCUMENTS

CN 106279619 A 1/2017
CN 109422880 A 3/2019
(Continued)

OTHER PUBLICATIONS

Lee, S. "International Preliminary Report on Patentability for PCT/MY2019/000017." Nov. 16, 2021. WIPO. Patentscope. (Year: 2021).*
(Continued)

*Primary Examiner* — Christopher W Raimund
(74) *Attorney, Agent, or Firm* — Buchanan Ingersoll & Rooney PC

(57) ABSTRACT

The present invention relates to methods for reprocessing elastomeric films or articles comprising an elastomer film wherein the elastomeric film is made from a polymer latex comprising: (a) particles of a carboxylated conjugated diene nitrile latex polymer (a) obtainable by free-radical emulsion polymerization of a mixture of ethylenically unsaturated monomers comprising conjugated dienes; monomers selected from ethylenically unsaturated nitrile compounds; ethylenically unsaturated carboxylic acids and/or salts thereof; optionally vinyl aromatic monomers; and optionally alkyl esters of ethylenically unsaturated acids, in combination or association with (b) particles of a latex polymer (b) comprising at least one oxirane-functional group; wherein the monomer composition of the latex polymer (a) is dif- (Continued)

ferent from the monomer composition of the latex polymer (b) and to the use of the polymer latex to make an elastomeric film obtained from the polymer latex self-healing, repairable and/or recyclable.

12 Claims, 5 Drawing Sheets

(51) Int. Cl.
    *B29C 41/14*     (2006.01)
    *B29C 71/02*     (2006.01)
    *B29C 73/34*     (2006.01)
    *B29K 9/00*     (2006.01)
    *C08J 5/18*     (2006.01)
    *C08J 11/06*     (2006.01)
    *C08L 9/04*     (2006.01)

(52) U.S. Cl.
    CPC ............ *B29C 73/34* (2013.01); *C08J 5/18* (2013.01); *C08J 11/06* (2013.01); *C08L 9/04* (2013.01); *B29C 2071/022* (2013.01); *B29K 2009/00* (2013.01); *C08J 2309/04* (2013.01); *C08L 2203/16* (2013.01); *C08L 2207/20* (2013.01)

(58) Field of Classification Search
    CPC ..... B29C 73/30; B29B 17/04; B29B 17/0408; B29B 2017/042; B29B 2017/0476; B29B 17/0404; B29B 17/0026; C08J 5/18; C08J 11/06; C08J 2309/04; C08L 9/04; C08L 2203/16; C08L 2207/20; B29K 2009/00; Y02W 30/52; Y02W 30/62; Y02W 30/20
See application file for complete search history.

(56) References Cited

U.S. PATENT DOCUMENTS

| | | |
|---|---|---|
| 2013/0299731 A1 | 11/2013 | Wright et al. |
| 2018/0126618 A1 | 5/2018 | Middlesworth et al. |
| 2018/0231486 A1 | 8/2018 | Haick et al. |
| 2019/0106544 A1 | 4/2019 | Bao et al. |

FOREIGN PATENT DOCUMENTS

| | | | |
|---|---|---|---|
| EP | 792891 A1 | 9/1997 | |
| JP | 2015174928 A | 10/2015 | |
| TW | 201510149 A | 3/2015 | |
| TW | 201821240 A | 6/2018 | |
| TW | 201821494 A | 6/2018 | |
| WO | 2015046049 A1 | 4/2015 | |
| WO | WO-2017209596 A1 * | 12/2017 | ............ B29C 41/14 |
| WO | 2018225166 A1 | 12/2018 | |

OTHER PUBLICATIONS

Chandler, "Biomedical Materials Learn to Heal Themselves", IEEE Pulse, Jun. 14, 2018, https://www.embs.org/pulse/articles/biomedical-materials-learn-to-heal-themselves/. (Year: 2018).*
Roylance, D., "Engineering Viscoelasticity", Department of Materials Science and Engineering, Massachusetts Institute of Technology, Oct. 24, 2001, 37 pages.
International Search Report and Written Opinion for International Application PCT/MY2019/000017, dated Jan. 1, 2020, 12 pages.
Office Action issued Jul. 26, 2024, by the State Intellectual Property Office of People's Republic of China in corresponding Chinese Patent Application No. 201980096411.6 with an English translation. (18 pages).
Office Action (relevant sections) and Search Report issued Feb. 20, 2024, by the Taiwanese Patent Office in corresponding Taiwanese Patent Application No. 109112373. (7 pages).

* cited by examiner

METHOD FOR REPAIRING OR RECYCLING AN ELASTOMERIC FILM

CROSS REFERENCE TO RELATED APPLICATIONS

This is the national phase of International Application No. PCT/MY2019/000017, filed 17 May 2019. The disclosure of this application is incorporated herein by reference in its entirety for all purposes.

FIELD OF INVENTION

The present invention relates to methods for repairing or recycling elastomeric films and in particular but not exclusively to repairing or recycling an elastomeric film using thermal re-processing. In addition, the invention relates to the use of a specific polymer latex to make an elastomeric film made from an aqueous dispersion of said polymer latex particles repairable and recyclable and also to allow for self-healing of said films.

BACKGROUND OF THE INVENTION

According to the present industry standard, elastomeric films, in particular in dip-molding applications, for example examination gloves, are made from compounds containing carboxylated acrylonitrile butadiene latices (XNBR). In order to obtain the required mechanical strength for the purpose of use of these elastomeric films, some crosslinking of the films during the manufacturing of the elastomeric films needs to be achieved.

Several different concepts are available in the prior art in order to obtain such crosslinked elastomeric films. One possibility is that the compound for making the elastomeric films contains a conventional sulfur vulcanization system such as sulfur in combination with accelerators, such as thiurams and carbamates and zinc oxide.

Since sulfur vulcanization systems might lead to allergic reactions, alternative concepts to make the latex film curable have been developed. Another possibility is to include in the compound a crosslinker component like, for example polyvalent cation, for example zinc oxide or other poly-functional organic compounds suitable to react with functional groups on the latex particles in order to achieve chemical crosslinking. Furthermore, if the polymer latex bears sufficient amounts of self-crosslinking groups, for example N-methylol amide groups, sulfur vulcanization systems and/or crosslinkers may be totally avoided.

All these different concepts lead to crosslinked elastomeric films, wherein the crosslinks are in essence irreversible so that that these elastomeric films cannot easily be recycled nor do they show any self-healing properties to make them repairable. For example, if any kind of defect such as pinholes occur during the manufacturing of the elastomeric film because of the lack of self-healing properties of the film, these products need to be scrapped, resulting in non-reusable waste. In addition, if such elastomeric films crack during their use, this cannot be repaired, resulting in an irreversible destruction of the elastomeric film and, thus, to failure of the article containing such elastomeric film.

Accordingly, there is a desire in the industry for elastomeric films that have inherent self-healing properties and can potentially be recycled in order to reduce the non-usable waste of such elastomeric films and to avoid final failure of articles comprising such elastomeric films.

WO 2017/209596 discloses a polymer latex for dip-molding applications comprising two different types of latex particles. One kind of latex particles is carboxylated whereas the second kind of latex particles contains oxirane-functional groups.

Thus, the present invention seeks to provide a method for repairing or recycling an elastomeric film and to select a specific polymer latex for making an elastomeric film obtained from said polymer latex repairable and recyclable.

SUMMARY OF THE INVENTION

The present inventors have surprisingly found that an elastomeric film made from a polymer latex comprising:
(a) particles of a carboxylated conjugated diene nitrile latex polymer (a) obtainable by free-radical emulsion polymerization of a mixture of ethylenically unsaturated monomers comprising:
  15 to 99 wt.-% of conjugated dienes;
  1 to 80 wt.-% of monomers selected from ethylenically unsaturated nitrile compounds;
  0.05 to 10 wt.-% of ethylenically unsaturated carboxylic acids and/or salts thereof;
  0 to 50 wt.-% of vinyl aromatic monomers; and
  0 to 65 wt.-% of alkyl esters of ethylenically unsaturated acids, the weight percentages being based on the total monomers in the mixture
in combination or association with
(b) particles of a latex polymer (b) comprising at least one oxirane-functional group; wherein
the monomer composition of the latex polymer (a) is different from the monomer composition of the latex polymer (b) has self-healing properties and thus can be repaired and recycled. This was not possible before with sulfur vulcanized elastomeric films known from the prior art.

According to one aspect the present invention relates to a method for repairing an elastomeric film or an article comprising said elastomeric film by
a) providing a damaged elastomeric film or article comprising a damaged elastomeric film, the damaged elastomeric film having at least surfaces to be reconnected,
b) re-joining the surfaces of the damaged film, and
c) heating or annealing the damaged elastomeric film while maintaining intimate contact of the rejoined surfaces of the damaged film at a temperature of 40° C. to 200° C., wherein
the elastomeric film is made from a polymer latex comprising:
  (a) particles of a carboxylated conjugated diene nitrile latex polymer (a) obtainable by free-radical emulsion polymerization of a mixture of ethylenically unsaturated monomers comprising:
    15 to 99 wt.-% of conjugated dienes;
    1 to 80 wt.-% of monomers selected from ethylenically unsaturated nitrile compounds;
    0.05 to 10 wt.-% of ethylenically unsaturated carboxylic acids and/or salts thereof;
    0 to 50 wt.-% of vinyl aromatic monomers; and
    0 to 65 wt.-% of alkyl esters of ethylenically unsaturated acids, the weight percentages being based on the total monomers in the mixture
in combination or association with
  (b) particles of a latex polymer (b) comprising at least one oxirane-functional group; wherein
the monomer composition of the latex polymer (a) is different from the monomer composition of the latex polymer (b).

According to a further aspect the present invention relates to a method for recycling an elastomeric film or article comprising an elastomeric film by cutting, shredding or comminuting said elastomeric film or article to form particles of the elastomer, optionally blending the obtained particles with particles of virgin elastomer, and forming a recycled film or article by subjecting the particles to a pressure of 1-20 MPa and a temperature of 40° C. to 200° C., wherein the elastomeric film is made from a polymer latex comprising:
(a) particles of a carboxylated conjugated diene nitrile latex polymer (a) obtainable by free-radical emulsion polymerization of a mixture of ethylenically unsaturated monomers comprising:
   15 to 99 wt.-% of conjugated dienes;
   1 to 80 wt.-% of monomers selected from ethylenically unsaturated nitrile compounds;
   0.05 to 10 wt.-% of ethylenically unsaturated carboxylic acids and/or salts thereof;
   0 to 50 wt.-% of vinyl aromatic monomers; and
   0 to 65 wt.-% of alkyl esters of ethylenically unsaturated acids,
the weight percentages being based on the total monomers in the mixture in combination or association with
(b) particles of a latex polymer (b) comprising at least one oxirane-functional group; wherein
the monomer composition of the latex polymer (a) is different from the monomer composition of the latex polymer (b).

According to still a further aspect the present invention relates to the use of a polymer latex comprising:
(a) particles of a carboxylated conjugated diene nitrile latex polymer (a) obtainable by free-radical emulsion polymerization of a mixture of ethylenically unsaturated monomers comprising:
   15 to 99 wt.-% of conjugated dienes;
   1 to 80 wt.-% of monomers selected from ethylenically unsaturated nitrile compounds;
   0.05 to 10 wt.-% of ethylenically unsaturated carboxylic acids and/or salts thereof;
   0 to 50 wt.-% of vinyl aromatic monomers; and
   0 to 65 wt.-% of alkyl esters of ethylenically unsaturated acids,
the weight percentages being based on the total monomers in the mixture
in combination or association with
(b) particles of a latex polymer (b) comprising at least one oxirane-functional group; wherein
the monomer composition of the latex polymer (a) is different from the monomer composition of the latex polymer (b)
to make an elastomeric film obtained from said polymer latex self-healing, repairable and/or recyclable.

DETAILED DESCRIPTION OF THE INVENTION

Figure 1:
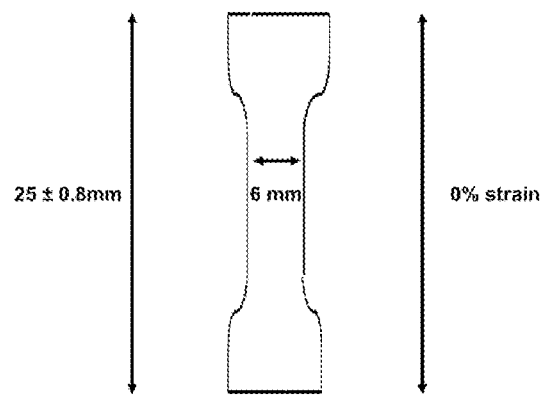
FIG. 1 illustrates a cast film from Examples 9, 20 and 22.

Polymer Latex to be Used to Make an Elastomeric Film Obtained Therefrom Self-Healing, Repairable and/or Recyclable The polymer latex to be used according to one aspect of the present invention to impart to an elastomeric film obtained therefrom self-healing properties to make said elastomeric film repairable and/or recyclable comprises:
(a) particles of a carboxylated conjugated diene nitrile latex polymer (a) obtainable by free-radical emulsion polymerization of a mixture of ethylenically unsaturated monomers comprising:
   15 to 99 wt.-% of conjugated dienes;
   1 to 80 wt.-% of monomers selected from ethylenically unsaturated nitrile compounds;
   0.05 to 10 wt.-% of ethylenically unsaturated carboxylic acids and/or salts thereof;
   0 to 50 wt.-% of vinyl aromatic monomers; and
   0 to 65 wt.-% of alkyl esters of ethylenically unsaturated acids,
the weight percentages being based on the total monomers in the mixture in combination or association with
(b) particles of a latex polymer (b) comprising at least one oxirane-functional group;
wherein the monomer composition of the latex polymer (a) is different from the monomer composition of the latex polymer (b).

The term "in combination or association" covers a latex wherein the latex polymer (a) and the latex polymer (b) are present as a physical mixture such as a blend of both latex polymers as well as a latex wherein the latex polymer (a) and the latex polymer (b) exhibit any kind of chemical or physical interaction between particles of latex polymer (a) and latex polymer (b). According to the present invention, combination or association of particles of said latex polymer (a) with particles of said latex polymer (b) can be achieved by for example one of the following measures:
(i) the mixture of ethylenically unsaturated monomers for latex polymer (a) is polymerized in presence of the oxirane-functional latex particles (b) in the free-radical emulsion polymerization;
(ii) a polymer latex comprising the particles of latex polymer (a) and a polymer latex comprising the particles of latex polymer (b) are preformed and subsequently both latices are combined; and
(iii) the mixture of ethylenically unsaturated monomers for latex polymer (a) is polymerized in presence of the oxirane-functional latex particles (b) in the free-radical emulsion polymerization forming a first polymer latex, and a second polymer latex comprising the particles of latex polymer (b) is preformed and subsequently both latices are combined, wherein the latex comprising the oxirane-functional latex particles (b) present in the polymerization of the mixture of ethylenically unsaturated monomers for latex polymer (a) and the second polymer latex comprising the particles of component (b) are the same or are different.

The term "the monomer composition of the latex polymer (a) is different from the monomer composition of the latex polymer (b)" encompasses that the monomers used for the preparation of latex polymer (a) are different from the monomers for the preparation of latex polymer (b) or that the monomers are the same but are used in different relative amounts when preparing latex polymer (a) and latex polymer (b).

The polymer latex of the present invention may comprise:
(a) particles of a carboxylated conjugated diene nitrile latex polymer (a) obtainable by free-radical emulsion polymerization of a mixture of ethylenically unsaturated monomers comprising:
   15 to 99 wt.-% of conjugated dienes;
   1 to 80 wt.-% of monomers selected from ethylenically unsaturated nitrile compounds;
   0.05 to 10 wt.-% of ethylenically unsaturated carboxylic acids and/or salts thereof;
   0 to 50 wt.-% of vinyl aromatic monomers; and
   0 to 65 wt.-% of alkyl esters of ethylenically unsaturated acids,
   0 to 5 wt.-%, preferably 0 to 3 wt.-% of ethylenically unsaturated monomers bearing an oxirane functional group
   the weight percentages being based on the total monomers in the mixture for latex polymer a)
in combination or association with
(b) particles of a latex polymer (b) obtainable by free-radical emulsion polymerization of a mixture of ethylenically unsaturated monomers comprising more than 5 wt.-%, preferably at least 10 wt.-% more preferred at least 15 wt.-% of ethylenically unsaturated monomers bearing an oxirane functional group based on the total monomers in the mixture for latex polymer b).

Latex Polymer (b) Comprising at Least One Oxirane-Functional Group

The latex polymer (b) to be used according to the present invention can be prepared by any suitable free-radical emulsion polymerization process known in the art. Suitable process parameters are those that will be discussed below with respect to the emulsion polymerization process for the preparation of latex polymer (a).

The unsaturated monomers to be used for the preparation of the latex polymer (b) and their relative amounts are not particularly critical as long as the monomer mixture comprises at least one ethylenically unsaturated monomer bearing an oxirane-functional group. According to the present invention the oxirane-functional ethylenically unsaturated monomer may be monofunctional with respect to the oxirane functionality and does not contain an oligomeric or polymeric backbone. Particularly, the number average molecular weight of the oxirane-functional ethylenically unsaturated monomer is below 280 Dalton.

Suitable oxirane-functional ethylenically unsaturated monomers may be selected from glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate and combinations thereof. Glycidyl (meth)acrylate is particularly preferred.

The oxirane-functional latex polymer (b) according to the present invention may comprise structural units derived from ethylenically unsaturated oxirane-functional monomers in an amount of 1 to 80 wt.-%, preferably 20 to 70 wt.-%, more preferred 25 to 65 wt.-%, most preferred 35 to 65 wt.-%, based on the total weight of monomers for the oxirane-functional latex particles (b). Thus, the lower limit for the amount of ethylenically unsaturated oxirane-functional monomers may be 1 wt.-%, or 5 wt.-%, or 10 wt.-%, or 12 wt.-%, or 14 wt.-%, or 16 wt.-%, or 18 wt.-%, or 20 wt.-%, or 22 wt.-%, or 24 wt.-%, or 26 wt.-%, or 28 wt.-%, or 30 wt.-%, or 32 wt.-%, or 34 wt.-%, or 35 wt.-%, based on the total weight of monomers for the oxirane-functional latex particles (b). Accordingly, the upper limit for the amount of ethylenically unsaturated oxirane-functional monomers may be 80 wt.-%, or 75 wt.-%, or 73 wt.-%, or 70 wt.-%, or 68 wt.-%, or 65 wt.-%, or 62 wt.-%, or 60 wt.-%, or 58 wt.-%, or 56 wt.-%, or 54 wt.-%, or 52 wt.-%, or 50 wt.-%, based on the total weight of monomers for the oxirane-functional latex particles (b). A person skilled in the art will understand that any range formed by any of the explicitly disclosed lower limits and upper limits is explicitly encompassed in the present specification.

Suitable additional monomers for the preparation of the oxirane-functional latex polymer (b) according to the present invention can be selected from
   ethylenically unsaturated nitrile compounds;
   vinyl aromatic monomers;
   alkyl esters of ethylenically unsaturated acids;
   hydroxyalkyl esters of ethylenically unsaturated acids;
   amides of ethylenically unsaturated acids;
   ethylenically unsaturated acids;
   ethylenically unsaturated sulfonic acid monomers and/or ethylenically unsaturated phosphorous-containing acid monomers
   vinyl carboxylates;
   conjugated dienes;
   monomers having at least two ethylenically unsaturated groups; and
   combinations thereof.

Examples of ethylenically unsaturated nitrile monomers which can be used for the preparation of the oxirane-functional latex polymer (b) according to the present invention include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred.

Representatives of vinyl-aromatic monomers include, for example, styrene, α-methylstyrene, p-methylstyrene, t-butylstyrene and vinyltoluene. Preferably, the vinyl-aromatic monomers are selected from styrene, alpha-methyl styrene and combinations thereof.

Esters of (meth)acrylic acid that can be used to prepare the oxirane-functional latex particles (b) according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth)acrylate and alkoxyalkyl (meth)acrylate monomers.

In general, the preferred alkyl esters of (meth)acrylic acids may be selected from $C_1$-$C_{20}$ alkyl (meth)acrylate, preferably $C_1$-$C_{10}$-alkyl (meth)acrylates. Examples of such acrylate monomers include n-butyl acrylate, secondary butyl acrylate, methyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. It is particularly preferred to select the esters of (meth)acrylic acids from methyl (meth)acrylate, ethyl (meth)acrylate, propyl (meth)acrylate, butyl (meth) acrylate, 2-ethylhexyl (meth)acrylate and combinations thereof.

The hydroxy alkyl(meth)acrylate monomers which can be used to prepare the oxirane-functional latex polymer (b) according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is selected from 2-hydroxy ethyl (meth)acrylate.

Amides of ethylenically unsaturated acids that can be used for the preparation of the oxirane-functional latex polymer (b) according to the present invention include acrylamide, methacrylamide, and diacetone acrylamide. The preferred amide monomer is (meth)acrylamide.

Vinyl ester monomers which can be used to prepare the oxirane-functional latex polymer (b) according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester is vinyl acetate.

The ethylenically unsaturated carboxylic acid monomers suitable for the preparation of the oxirane-functional latex polymer (b) according to the present invention include monocarboxylic acid and dicarboxylic acid monomers and monoesters of dicarboxylic acid. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. Preferably, the ethylenically unsaturated carboxylic acid monomers are selected from (meth) acrylic acid, crotonic acid, itaconic acid, maleic acid, fumaric acid and combinations thereof.

Conjugated diene monomers suitable for the preparation of the oxirane-functional latex polymer (b) according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene and 1,3-cyclohexadiene. 1,3-Butadiene, isoprene and combinations thereof are the preferred conjugated dienes.

Furthermore, monomers having at least two ethylenically unsaturated groups can be used in the preparation of the oxirane-functional latex polymer (b). Suitable bifunctional monomers which are capable of providing internal crosslinking and branching in the polymer (herein known as multifunctional monomers), may be selected from divinyl benzene and diacrylates and di(meth)acrylates. Examples are ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth) acrylate, and dipropylene glycol di(meth)acrylate. The monomers having at least two ethylenically unsaturated groups are preferably selected from divinyl benzene 1,2-ethyleneglycol di(meth)acrylate, 1,4-butanediol di(meth) acrylate and 1,6-hexanediol di(meth)acrylate.

The oxirane-functional latex polymer (b) according to the present invention may comprise structural units derived from 0 to 50 wt.-%, preferably 0 to 30 wt.-%, more preferred 0 to 20 wt.-%, of monomers selected from ethylenically unsaturated nitrile compounds, preferably acrylonitrile;

0 to 95 wt.-%, preferably 0 to 70 wt.-%, more preferred 0 to 50 wt.-% of vinyl aromatic monomers, preferably styrene;

0 to 95 wt.-%, preferably 5 to 95 wt.-%, more preferred 20 to 95 wt.-% of $C_1$ to $C_8$ alkyl (meth)acrylates;

0 to 10 wt.-%, preferably 0 to 7 wt.-%, more preferred 0.01 to 7 wt.-% of ethylenically unsaturated acids, preferably (meth)acrylic acid;

0 to 10 wt.-%, preferably 0 to 8 wt.-%, more preferred 0 to 6 wt.-% of ethylenically unsaturated compounds bearing silane, sulfonate, sulfonic acid, phosphate, amide and/or N-methylolamide groups;

0 to 50 wt.-%, preferably 0 to 40 wt.-%, more preferred 0 to 20 wt.-% of vinyl carboxylates, preferably vinyl acetate;

1 to 80 wt.-%, preferably 20 to 70 wt.-%, more preferred 25 to 65 wt.-%, most preferred 35 to 65 wt.-% of structural units derived from ethylenically unsaturated oxirane-functional monomers.

Alternatively, the oxirane-functional latex polymer (b) according to the present invention may comprise structural units derived from 2 to 95 wt.-%, preferably 10 to 95 wt.-%, more preferred 20 to 95 wt.-% of conjugated dienes, preferably selected from butadiene, isoprene and combinations thereof, more preferred butadiene;

1 to 50 wt.-%, preferably 5 to 50 wt.-%, more preferred 5 to 40 wt.-% of monomers selected from ethylenically unsaturated nitrile compounds, preferably acrylonitrile;

0 to 95 wt.-%, preferably 0 to 90 wt.-%, more preferred 0 to 70 wt.-%, of vinyl aromatic monomers, preferably styrene;

0 to 95 wt.-%, preferably 0 to 90 wt.-%, more preferred 0 to 70 wt.-% of $C_1$ to $C_8$ alkyl (meth)acrylates;

0 to 10 wt.-%, preferably 0 to 8 wt.-%, more preferred 0 to 7 wt.-% of ethylenically unsaturated acids, preferably (meth)acrylic acid;

0 to 10 wt.-%, preferably 0 to 8 wt.-%, more preferred 0 to 6 wt.-% of ethylenically unsaturated compounds bearing silane, sulfonate, sulfonic acid, phosphate, amide and/or N-methylolamide groups, 1 to 80 wt.-%, preferably 20 to 70 wt.-%, more preferred 25 to 65 wt.-%, most preferred 35 to 65 wt.-% of structural units derived from ethylenically unsaturated oxirane-functional monomers.

According to the present invention, the amounts of the above-defined monomers for the preparation of latex polymer (b) may add up to 100 wt.-%.

The glass transition temperature (mid-point temperature Tmg) of the oxirane-functional latex polymer (b) according to the present invention may be −50° to 50° C. as measured by DSC according to ASTM D3418-03, preferably −40° C. to 40° C., more preferably −30° C. to 30° C., more preferred −25° C. to 25° C. and most preferred −22° C. to 22° C. Thus, the lower limit of the Tmg range may be −50, −45, −40, −38, −36, −34, −32, −30, −29, −28, −27, −26, −25, −24, −23, or −22° C. The upper limit of the Tmg range may be 50, 45, 40, 38, 36, 34, 32, 30, 29, 28, 27, 26, 25, 24, 23, or 22° C. A person skilled in the art will understand that any range formed by any of the explicitly disclosed lower limits and upper limits is explicitly encompassed in the present specification.

The z-average particle size measured with a Malvern zetasizer nano S (ZEN 1600) using dynamic light scattering (DLS) of the oxirane-functional latex particles (b) according to the present invention, irrespective of whether it is employed as latex, added during the polymerization of latex polymer (a) or as preformed latex blended with the latex polymer (a), is preferably 5 to 90 nm, more preferably 15 to 85 nm, more preferred 20 to 80 nm. The lower limit of the z-average particle size therefore can be 5 nm, 7 nm, 8 nm, 9 nm, 10 nm, 11 nm, 12 nm, 13 nm, 14 nm, 15 nm, 16 nm, 17 nm, 18 nm, 19 nm, or 20 nm, whereas the upper limit can be 90 nm, 85 nm, 80 nm, 75 nm, 70 nm, 65 nm, 60 nm, 55 nm, 50 nm, 45 nm, 40 nm, 38 nm, 36 nm, 34 nm, 32 nm, or 30 nm. A person skilled in the art will understand that any range formed by any of the explicitly disclosed lower limits and upper limits is explicitly encompassed in the present specification.

A person skilled in the art will appreciate that the oxirane-functional latex polymer (b) of the present invention can be used as particles (for example as seed particles) present in the emulsion polymerization of the latex polymer (a) or can be blended with a preformed latex polymer (a) whereby the preformed latex polymer (a) can be made by emulsion polymerization with or without oxirane-functional latex polymer (b) according to the present invention as particles present in the emulsion polymerization for example as seed particles. The person skilled in the art will also appreciate that the oxirane-functional latex particles (b) used as particles present in the emulsion polymerization of the preformed latex polymer (a) and the oxirane-functional latex polymer (b) blended with the preformed latex polymer (a) may be the same or different.

Latex Polymer (a)

According to the present invention the mixture of ethylenically unsaturated monomers for preparing the latex polymer (a) comprises 15 to 99 wt.-% of conjugated dienes;

1 to 80 wt.-% of monomers selected from ethylenically unsaturated nitrile compounds;

0.05 to 10 wt.-% of ethylenically unsaturated carboxylic acids and/or salts thereof;

0 to 50 wt.-% of vinyl aromatic monomers; and 0 to 65 wt.-% of alkyl esters of ethylenically unsaturated acids, the weight percentages being based on the total monomers employed in the emulsion polymerization.

In the mixture of ethylenically unsaturated monomers additional ethylenically unsaturated monomers may be present, that are selected from hydroxyalkyl esters of ethylenically unsaturated acids;

amides of ethylenically unsaturated acids;

vinyl carboxylates;

monomers having at least two ethylenically unsaturated groups;

ethylenically unsaturated silanes;

oxirane functional ethylenically unsaturated compounds; and combinations thereof.

According to the present invention the mixture of ethylenically unsaturated monomers for preparing the latex polymer (a) may be free of oxirane functional monomers.

Conjugated diene monomers suitable for the preparation of latex polymer (a) according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene, 1,3-cyclohexadiene, myrcene, ocimene, and farnasene. 1,3-Butadiene, isoprene and combinations thereof are the preferred conjugated dienes. 1,3-Butadiene is the most preferred diene. Typically, the amount of conjugated diene monomer ranges from 15 to 99 wt.-%, preferably from 20 to 99 wt.-%, more preferred from 30 to 75 wt.-%, most preferred from 40 to 70 wt.-%, based on the total weight of monomers. Thus, the conjugated diene may be present in amounts of at least 15 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the conjugated diene monomers can be used in amounts of no more than 95 wt.-%, no more than 90 wt.-%, no more than 85 wt.-%, no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, or no more than 56 wt.-%. A person skilled in the art will appreciate that any range between any of the explicitly disclosed lower and upper limit is herein disclosed.

Unsaturated nitrile monomers which can be used to make the particles of latex polymer (a) include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred. These nitrile monomers can be included in amounts from 1 to 80 wt.-%, preferably from 10 to 70 wt.-%, or 1 to 60 wt.-%, and more preferred from 15 to 50 wt.-%, even more preferred from 20 to 50 wt.-%, most preferred from 23 to 43 wt.-%, based on the total weight of ethylenically unsaturated monomers for latex polymer (a).

Thus, the unsaturated nitrile may be present in amounts of at least 1 wt.-%, 5 wt.-%, at least 10 wt.-%, at least 12 wt.-%, at least 14 wt.-%, at least 16 wt.-%, at least 18 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the unsaturated nitrile monomers can be used in amounts of no more than 80 wt.-%, no more than 75 wt.-%, no more than 73 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, or no more than 44 wt.-%. A person skilled in the art will appreciate that any range between any of the explicitly disclosed lower and upper limit is herein disclosed.

The ethylenically unsaturated carboxylic acids or salts thereof may be selected from monocarboxylic acid and dicarboxylic acid monomers and their anhydrides and partial esters of polycarboxylic acids. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid, cis-cyclohexene-1,2-dicarboxylic acid, dimethylmaleic acid, bromomaleic acid, 2,3-dichloromaleic acid and (2-dodecen-1-yl) succinic acid. Examples of polycarboxylic acid partial esters include monomethyl maleate, monomethyl fumarate, monoethyl maleate, monoethyl fumarate, monopropyl maleate, monopropyl fumarate, monobutyl maleate, monobutyl fumarate, mono(2-ethyl hexyl) maleate, mono (2-ethyl hexyl) fumarate. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. (Meth)acrylic acid, crotonic acid, itaconic acid, maleic acid, fumaric acid and combinations thereof are particularly preferred.

The use of ethylenically unsaturated carboxylic acid monomers influences the properties of the polymer dispersion and of the film produced thereof. The type and the amount of these monomers are determined thereby. Typically, such an amount is from 0.05 to 10 wt.-%, particularly from 0.1 to 10 wt.-% or 0.05 to 7 wt.-%, preferably from 0.1 to 9 wt.-%, more preferred from 0.1 to 8 wt.-%, even more preferred from 1 to 7 wt.-%, most preferred 2 to 7 wt.-%, based on the total weight of the ethylenically unsaturated monomers for latex polymer (a). Thus, the ethylenically unsaturated carboxylic acid monomers may be present in amounts of at least 0.01 wt.-%, at least 0.05 wt.-%, at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%. Likewise, the ethylenically unsaturated carboxylic acid monomers may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total weight of ethylenically unsaturated monomers for latex polymer (a). A person skilled in the art will appreciate that any range defined by an explicitly disclosed lower limit and an explicitly disclosed upper limit is disclosed herewith.

Representatives of vinyl-aromatic monomers include, for example, styrene, α-methylstyrene, vinyltoluene, o-methylstyrene, p-methylstyrene, p-tert-butylstyrene, 2,4-dimethylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, vinyltoluene and vinylxylene, 2-vinylpyridine, 4-vinylpyridine and 1,1-diphenylethylenes and substituted 1,1-diphenylethylenes, 1,2-diphenylethene and substituted 1,2-diphenylethylenes. Mixtures of one or more of the vinyl-aromatic compounds may also be used. The preferred monomers are styrene and α-methylstyrene. The vinyl-aromatic compounds can be used in a range of from 0 to 50 wt.-%, preferably from 0 to 40 wt.-% more preferred from 0 to 25 wt.-%, even more preferred from 0 to 15 wt.-%, and most preferred from 0 to 10 wt.-%, based on the total weight of ethylenically unsaturated monomers for latex polymer (a). Thus, the vinyl-aromatic compound can be present in an amount of no more than 35 wt.-%, no more than 30 wt.-%, no more than 25 wt.-%, no more than 20 wt.-%, no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a). Vinyl-aromatic compounds may also be completely absent.

Further, the mixture of ethylenically unsaturated monomers for latex polymer (a) according to the present invention may include additional ethylenically unsaturated monomers that are different from the above-defined monomers. These monomers may be selected from esters of (meth)acrylic acid, vinyl esters, and amides of ethylenically unsaturated acids or ethylenically unsaturated silane compounds.

Vinyl ester monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomer for use in the present invention is vinyl acetate. Typically, the vinyl ester monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Examples of suitable ethylenically unsaturated silane compounds can be selected from triethoxyvinylsilane and 3-methacryloxypropyltrimethoxysilane. The ethylenically unsaturated silane compounds can be present in an amount of 0.05 to 5.0 wt.-%, preferably 0.3 to 2.0 wt.-%, more preferred 0.3 to 1.0 wt.-%, based on the total weight of ethylenically unsaturated monomers for latex polymer (a).

Esters of (meth)acrylic acid that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_8$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Methyl (meth)acrylate, ethyl (meth)acrylate, propyl (meth) acrylate, butyl (meth)acrylate, 2-ethylhexyl (meth)acrylate and combinations thereof are preferred.

Typically, the alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

The hydroxy alkyl(meth)acrylate monomers which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is 2-hydroxy ethyl(meth) acrylate. Typically, hydroxy alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Amides of ethylenically unsaturated acids that can be used for the preparation of the polymer latex according to the present invention include acrylamide, methacrylamide, and diacetone acrylamide. The preferred amide monomer is (meth)acrylamide. In order to introduce functional groups that are capable of self-crosslinking upon heat treatment into the polymer particles of the present invention monomers comprising N-methylol amide groups may be employed. Suitable monomers are N-methylol (meth)acrylamide, N-methoxymethyl-(meth)acrylamide, N-n-butoxy-methyl-(meth)acrylamide, N-iso-butoxy-methyl-(meth)acrylamide, N-acetoxymethyl-(meth)acrylamide, N(-2,2-dimethoxy-1-hydroxyethyl) acrylamide. Typically, amides of ethylenically unsaturated acid can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Furthermore, monomers having at least two ethylenically unsaturated groups can be present in the monomer mixture for the preparation of the polymer latex of the present invention in an amount 0 to 6.0 wt.-%, preferably 0.1 to 3.5 wt.-%, based on the total weight of ethylenically unsaturated monomers. Typically, these monomers can be present in an amount of no more than 6 wt.-%, no more than 4 wt.-%, no more than 2 wt.-%, no more than 1 wt.-%, based on the total weight of ethylenically unsaturated monomers. Suitable bifunctional monomers which are capable of providing internal crosslinking and branching in the polymer (herein known as multifunctional monomers) may be selected from divinyl benzene and diacrylates and di(meth)acrylates. Examples are ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, and dipropylene glycol di(meth)acrylate. The monomers having at least two ethylenically unsaturated groups are preferably selected from divinyl benzene, 1,2 ethyleneglycol di(meth)acrylate, 1,4-butanediol di(meth) acrylate, 1,6-hexanediol di(meth)acrylate and trimethylolpropane tri(meth)acrylate.

Suitable oxirane functional monomers to be used in the preparation of latex polymer (a) are those as described above for the oxirane functional latex polymer (b) including the preferred embodiments. If employed, the oxirane functional monomers are preferably present in an amount of 5 wt.-% at most, more preferred 3 wt.-% at most based on the total amount of monomers to be used in the preparation of latex polymer (a). But as mentioned above it is most preferred that latex polymer (a) is free of oxirane functional groups.

The mixture of the ethylenically unsaturated monomers for latex polymer (a) may comprise from:
20 to 99 wt.-% of conjugated dienes, preferably selected from butadiene, isoprene and combinations thereof, more preferred butadiene;
1 to 60 wt.-% of monomers selected from ethylenically unsaturated nitrile compounds, preferably acrylonitrile;
0 to 40 wt.-% of vinyl aromatic monomers, preferably styrene;
0 to 25 wt.-% of $C_1$ to $C_8$ alkyl (meth)acrylates;
0.05 to 7 wt.-% of ethylenically unsaturated acids, preferably (meth)acrylic acid;
0 to 10 wt.-% of vinyl esters:
0 to 10 wt.-% of ethylenically unsaturated compounds bearing silane, amide and/or N-methylolamide groups,
the weight percentages being based on the total monomers present in the mixture.

According to the present invention, the amounts of the above-defined monomers for the preparation of latex polymer (a) may add up to 100 wt.-%.

According to the present invention, the mixture of ethylenically unsaturated monomers to be polymerized in the free-radical emulsion polymerization may also comprise:
(a) 15 to 90 wt.-% of isoprene;
(b) 1 to 80 wt.-% of acrylonitrile;
(c) 0.01 to 10 wt.-%, preferably 0.05 to 10 wt.-% of at least one ethylenically unsaturated acid;
(d) 0 to 40 wt.-% of at least one aromatic vinyl compound, and
(e) 0 to 20 wt.-% of at least one further ethylenically unsaturated compound different from any of compounds (a) to (d). The ranges for component (a) and/or (b) may be selected from the ranges for (a) conjugated dienes and (b) unsaturated nitrile as disclosed above. Likewise, specific embodiments and amounts for the components (c), (d) and/or (e) may be selected from those as described above for components (c), (d) and the additional polymers.

The z-average particle size measured with a Malvern zetasizer nano S (ZEN 1600) using dynamic light scattering (DLS) of the latex particles (a) according to the present invention is preferably 70 to 1000 nm, more preferably 80 to 1000 nm, more preferably 90 to 1000 nm, 100 to 1000 nm, more preferably 110 to 600 nm, more preferred 120 to 500 nm. The lower limit of the z-average particle size of the latex particles (a) therefore can be 70 nm, 80 nm, 90 nm, 100 nm, 105 nm or 110 nm, or 120 nm; the upper limit for the z-average average particle size can be 900 nm, 800 nm, 700 nm, 600 nm, 500 nm, 400 nm, 350 nm, 300 nm, 270 nm, 250 nm, 230 nm, 210 nm or 200 nm. A person skilled in the art will understand that any range formed by any of the explicitly disclosed lower limits and upper limits is explicitly encompassed in the present specification.

According to the present invention it is particularly preferred that the z-average particle size of the latex polymer (a) is larger than the z-average particle size of the latex polymer (b).

Method for the Preparation of the Polymer Latex of the Present Invention:

The latex polymer (a) according to the present invention can be made by any emulsion polymerization process known to a person skilled in the art, provided that the monomer mixture as herein defined is employed. Particularly suitable is the process as described in EP-A 792 891.

In the emulsion polymerization for preparing the latex polymer (a) of the present invention a seed latex may be employed. Preferably, the seed latex is the latex polymer (b) as described above including all disclosed variations. Alternatively, any other seed particles as known to the person skilled in the art can be used. But if no latex polymer (b) is used as seed particles, the particles of latex polymer (b) will have to be incorporated in the polymer latex of the present invention in any other suitable way like mixing a preformed latex comprising particles of latex polymer (a) with a preformed latex comprising particles of latex polymer (b).

The seed latex particles are preferably present in an amount of 0.01 to 10, preferably 1 to 5 parts by weight, based on 100 parts by weight of total ethylenically unsaturated monomers employed in the polymer latex including those for making the seed particles, such as the oxirane-functional latex particles (b). The lower limit of the amount of seed latex particles therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight.

The upper limit of the amount can be 10, 9, 8, 7, 6, 5.5, 5, 4.5, 4, 3.8, 3.6, 3.4, 3.3, 3.2, 3.1 or 3 parts by weight. A person skilled in the art will understand that any range formed by any of the explicitly disclosed lower limits and upper limits is explicitly encompassed in the present specification.

The process for the preparation of the above-described polymer latex can be performed at temperatures of from 0 to 130° C., preferably of from 0 to 100° C., particularly preferably of from 5 to 70° C., very particularly preferably of from 5 to 60° C., in the presence of no or one or more emulsifiers, no or one or more colloids and one or more initiators. The temperature includes all values and sub-values therebetween, especially including 5, 10, 15, 20, 25, 30, 35, 40, 45, 50, 55, 60, 65, 70, 75, 80, 85, 90, 95, 100, 105, 110, 115, 120 and 125° C.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid) and inorganic peroxy compounds, such as hydrogen peroxide, sodium, potassium and ammonium peroxydisulfate, peroxycarbonates and peroxyborates, as well as organic peroxy compounds, such as alkyl hydroperoxides, dialkyl peroxides, acyl hydroperoxides, and diacyl peroxides, as well as esters, such as tertiary butyl perbenzoate and combinations of inorganic and organic initiators.

The initiator is used in a sufficient amount to initiate the polymerization reaction at a desired rate. In general, an amount of initiator of from 0.01 to 5, preferably of from 0.1 to 4%, by weight, based on the weight of the total polymer, is sufficient. The amount of initiator is most preferably of from 0.01 to 2% by weight, based on the total weight of the polymer. The amount of initiator includes all values and sub-values therebetween, especially including 0.01, 0.1, 0.5, 1, 1.5, 2, 2.5, 3, 4 and 4.5% by weight, based on the total weight of the polymer.

The above-mentioned inorganic and organic peroxy compounds may also be used alone or in combination with one or more suitable reducing agents, as is well known in the art. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. More preferred is the use of a proprietary sodium salt of an organic sulfinic acid derivative, such as Bruggolite® FF6 or Bruggolite® FF6M. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, Sodium alkyl esters of sulfonic acid, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 20, preferably from 0 to 10, more preferably from 0 to 5, wt.-%, based on the total weight of the monomers. The amount of surfactant includes all values and sub-values there between, especially including 0, 0.1, 0.5, 1, 2, 3, 4, 5, 6, 7, 8, 9, 10, 11, 12, 13, 14, 15, 16, 17, 18 and 19 wt.-%, based on the total weight of the monomer. According to one embodiment of the present invention, the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polysaccharides, and degraded polysaccharides, polyethylene glycol and gum arabic. The preferred protective colloids are carboxymethylcellulose, hydroxyethylcellulose and hydroxypropylcellulose. In general, these protective colloids are used in contents of from 0 to 10, preferably from 0 to 5, more preferably from 0 to 2 parts by weight, based on the total weight of the monomers. The amount of protective colloids includes all values and sub-values therebetween, especially including 1, 2, 3, 4, 5, 6, 7, 8 and 9 wt.-%, based on the total weight of the monomers.

The person skilled in the art will appreciate the type and amounts of monomers bearing polar functional groups, surfactants and protective colloids that are to be selected to make the polymer latex according to the present invention suitable for dip-molding applications. Thus, it is preferred that the polymer latex composition of the present invention has a certain maximum electrolyte stability determined as critical coagulation concentration of less than 30 mmol/l $CaCl_2$, preferably less than 25 mmol/l, more preferred less than 20 mmol/l, most preferred less than 10 mmol/l (determined for a total solids content of the composition of 0.1% at pH 10 and 23° C.).

If the electrolyte stability is too high, then it will be difficult to coagulate the polymer latex in a dip-molding process, with the result that either no continuous film of the polymer latex on the immersed mold is formed or the thickness of the resulting product is non-uniform.

It is within the routine of the person skilled in the art to appropriately adjust the electrolyte stability of a polymer latex. The electrolyte stability will depend on certain different factors, for example, amount and selection of monomers to be used for making the polymer latex, especially monomers containing polar-functional groups, as well as the selection and amount of the stabilizing system, for example, the emulsion polymerization process for making the polymer latex. The stabilizing system may contain surface-active agents and/or protective colloids.

A person skilled in the art is able, depending on the selected monomers and their relative amounts for making the polymer latex of the present invention, to adjust the stabilizing system in order to achieve an electrolyte stability according to the present invention.

Since there are so many different influences on the electrolyte stability, the adjustment is best made by trial and error experiments. But this can be easily done without any inappropriate effort using the test method for electrolyte stability, as disclosed above.

It is frequently advisable to perform the emulsion polymerization additionally in the presence of buffer substances and chelating agents. Suitable substances are, for example, alkali metal carbonates and hydrogen carbonates, alkali metal phosphates and pyrophosphates (buffer substances) and the alkali metal salts of ethylenediaminetetraacetic acid (EDTA) or hydroxyl-2-ethylenediaminetriacetic acid (HEEDTA) as chelating agents. The quantity of buffer substances and chelating agents is usually 0.001-1.0 wt.-%, based on the total quantity of monomers.

Furthermore, it may be advantageous to use chain transfer agents (regulators) in emulsion polymerization. Typical agents are, for example, organic sulfur compounds, such as thioesters, 2-mercaptoethanol, 3-mercaptopropionic acid and $C_1$-$C_{12}$ alkyl mercaptans, n-dodecylmercaptan and t-dodecylmercaptan being preferred. The quantity of chain transfer agents, if present, is usually 0.05-3.0 wt.-%, preferably 0.2-2.0 wt.-%, based on the total weight of the used monomers.

Furthermore, it can be beneficial to introduce partial neutralization to the polymerization process. A person skilled in the art will appreciate that by appropriate selections of this parameter the necessary control can be achieved.

Various other additives and ingredients can be added in order to prepare the latex composition of the present invention. Such additives include, for example: antifoams, wetting agents, thickeners, plasticizers, fillers, pigments, dispersants, optical brighteners, antioxidants, biocides and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfate. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Titanium dioxide ($TiO_2$), calcium carbonate and clay are the fillers typically used.

In an alternative embodiment of the present invention a polymer latex comprising the particles of latex polymer (a) and a polymer latex comprising the particles of latex polymer (b) are preformed and subsequently both latices are combined. The emulsion polymerization for the preparation of the preformed latices comprising the latex polymer (a) and the latex polymer (b) respectively can be conducted in the same manner as described above for the preparation of the latex comprising the latex polymer (a) including all variations disclosed.

The polymer latex of the present invention may comprise 50 to 99 wt.-%, preferably 60 to 98, more preferred 65 to 97, most preferred 70 to 96 wt.-%, based on the total weight of latex particles in the composition of particles of latex polymer (a) and 1 to 50 wt.-%, preferably 2 to 40, more preferred 3 to 35, most preferred 4 to 30 wt.-%, based on the total weight of latex particles in the composition of the oxirane-functional latex polymer (b). Thus, the lower limit for the amount of particles of latex polymer (a) may be 50 wt.-%, or 55 wt.-%, or 58 wt.-%, or 60 wt.-%, or 62 wt.-%, or 63 wt.-%, or 64 wt.-%, or 65 wt.-%, or 66 wt.-%, or 67 wt.-%, or 68 wt.-%, or 69 wt.-%, or 70 wt.-%, based on the total weight of latex particles in the composition. The upper limit for the amount of particles of latex polymer (a) may be 99 wt.-%, or 98 wt.-%, or 97 wt.-%, or 96 wt.-%, or 95 wt.-%, or 94 wt.-%, or 93 wt.-%, or 92 wt.-%, or 91 wt.-%, or 90 wt.-%, or 89 wt.-%, or 88 wt.-%, or 87 wt.-%, or 86 wt.-%, or 85 wt.-%, or 84 wt.-%, or 83 wt.-%, or 82 wt.-%, or 81 wt.-%, or 80 wt.-%, based on the total weight of latex particles in the composition. The lower limit for the amount of particles of latex polymer (b) may be 1 wt.-%, or 1 wt.-%, or 1 wt.-%, or 1 wt.-%, or 5 wt.-%, or 6 wt.-%, or 7 wt.-%, or 8 wt.-%, or 9 wt.-%, or 10 wt.-%, or 11 wt.-%, or 12 wt.-%, or 13 wt.-%, or 14 wt.-%, or 15 wt.-%, or 16 wt.-%, or 17 wt.-%, or 18 wt.-%, or 19 wt.-%, or 20 wt.-%, based on the total weight of latex particles in the composition. The upper limit for the amount of particles of latex polymer (b) may be 50 wt.-%, or 45 wt.-%, or 42 wt.-%, or 40 wt.-%, or 38 wt.-%, or 37 wt.-%, or 36 wt.-%, or 35 wt.-%, or 34 wt.-%, or 33 wt.-%, or 32 wt.-%, or 31 wt.-%, or 30 wt.-%, based on the total weight of latex particles in the composition. A person skilled in the art will understand that any range formed by any of the explicitly disclosed lower limits and upper limits is explicitly encompassed in the present specification.

For the preparation of the polymer latex of the present invention it is also possible that the mixture of ethylenically unsaturated monomers for latex polymer (a) is polymerized in presence of particles of the oxirane-functional latex polymer (b) in the free-radical emulsion polymerization forming a first polymer latex, (for example particles of the oxirane-functional latex polymer (b) can be present as seed particles) to form a first polymer latex and a second polymer latex comprising the particles of latex polymer (b) is preformed and subsequently both latices are combined, wherein the oxirane-functional latex polymer (b) present in the polymerization of latex polymer (a) and the second polymer latex comprising the particles of latex polymer (b) may be the same or different. The respective emulsion polymerizations for forming the first and the second latex can be conducted in the same manner as described above for the preparation of the latex comprising the latex polymer (a) including all variations disclosed.

In said case the polymer latex of the present invention may comprise 50 to 99 wt.-%, preferably 60 to 98, more preferred 65 to 97, most preferred 70 to 96 wt.-%, based on the total weight of latex particles in the composition of particles of latex polymer (a) prepared in presence of particles of the oxirane-functional latex polymer (b) in an amount of 0.01 to 10, preferably 1 to 5 parts by weight based on 100 parts by weight of total ethylenically unsaturated monomers in the polymer latex (a) including those for making the oxirane-functional latex polymer (b) present in the polymerization of latex polymer (a) and 1 to 50 wt.-%, preferably 2 to 40, more preferred 3 to 35, most preferred 4 to 30 wt.-%, based on the total weight of latex particles in the composition of the second oxirane-functional latex particles (b).

The lower limit of the amount of oxirane-functional latex polymer (b) for the preparation of the first latex therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight. The upper limit of the amount can be 10, 9, 8, 7, 6, 5.5, 5, 4.5, 4, 3.8, 3.6, 3.4, 3.3, 3.2, 3.1 or 3 parts by weight. A person skilled in the art will understand that any range formed by any of the explicitly disclosed lower limits and upper limits is explicitly encompassed in the present specification.

Thus the lower limit for the amount of particles of the latex polymer (a) may be 50 wt.-%, or 55 wt.-%, or 58 wt.-%, or 60 wt.-%, or 62 wt.-%, or 63 wt.-%, or 64 wt.-%, or 65 wt.-%, or 66 wt.-%, or 67 wt.-%, or 68 wt.-%, or 69 wt.-%, or 70 wt.-%, based on the total weight of latex particles in the composition. The upper limit for the amount of particles of the latex polymer (a) may be 99 wt.-%, or 98 wt.-%, or 97 wt.-%, or 96 wt.-%, or 95 wt.-%, or 94 wt.-%, or 93 wt.-%, or 92 wt.-%, or 91 wt.-%, or 90 wt.-%, or 89 wt.-%, or 88 wt.-%, or 87 wt.-%, or 86 wt.-%, or 85 wt.-%, or 84 wt.-%, or 83 wt.-%, or 82 wt.-%, or 81 wt.-%, or 80 wt.-%, based on the total weight of latex particles in the composition. The lower limit for the amount of particles of the second latex polymer (b) may be 1 wt.-%, or 1 wt.-%, or 1 wt.-%, or 1 wt.-%, or 5 wt.-%, or 6 wt.-%, or 7 wt.-%, or 8 wt.-%, or 9 wt.-%, or 10 wt.-%, or 11 wt.-%, or 12 wt.-%, or 13 wt.-%, or 14 wt.-%, or 15 wt.-%, or 16 wt.-%, or 17 wt.-%, or 18 wt.-%, or 19 wt.-%, or 20 wt.-%, based on the total weight of latex particles in the composition. The upper limit for the amount of particles of the second latex polymer (b) may be 50 wt.-%, or 45 wt.-%, or 42 wt.-%, or 40 wt.-%, or 38 wt.-%, or 37 wt.-%, or 36 wt.-%, or 35 wt.-%, or 34 wt.-%, or 33 wt.-%, or 32 wt.-%, or 31 wt.-%, or 30 wt.-%, based on the total weight of latex particles in the composition. A person skilled in the art will understand that any range formed by any of the explicitly disclosed lower limits and upper limits is explicitly encompassed in the present specification.

Compounded Latex Composition for the Production of Dip-Molded Articles:

The polymer latex to be used to make the elastomeric film is particularly suitable for dip-molding processes. Therefore, the polymer latex is compounded to produce a curable polymer latex compound composition that can be directly used in dip-molding processes. To get reproducible good physical film properties, it is advisable to adjust the pH of the compounded polymer latex composition by pH modifiers to be in the range of pH 7 to 13, preferably 10.5 to 13, more preferred 11 to 12, for dipping to produce thin disposable gloves. For producing unsupported and/or supported reusable gloves, it is advisable to adjust the pH of the compounded polymer latex composition by pH modifiers to be in the range of pH 8 to 10, preferably 8.5 to 9.5. The compounded polymer latex composition contains the polymer latex of the present invention, optionally the pH modifiers, preferably ammonia or alkali hydroxides and optionally usual additives to be used in these compositions selected from antioxidants, pigments, $TiO_2$, fillers and dispersing agents.

Alternatively, instead of compounding the polymer latex of the present invention also a polymer latex comprising the latex polymer (a) as defined above may be compounded in the same way as described above and during or after the compounding step a polymer latex comprising the oxirane-functional latex polymer (b) as defined above is added to provide the compounded latex composition of the present invention. Also, a polymer latex comprising the oxirane-functional latex polymer (b) as defined above may be compounded in the same way as described above and during or after the compounding step a polymer latex (a) as defined above is added to provide the compounded latex composition of the present invention. Of course, all variations with respect to the latex polymer (a), oxirane-functional latex polymer (b) and their relative amounts based on the total amount of latex polymer as described above can be used.

But it is a particular advantage that sulfur vulcanization systems and cross-linkers and optionally ZnO may be totally avoided, while the polymer latex compound to be used according to the present invention is still curable to provide dip-molded articles having the required tensile and self-healing properties to make them repairable and/or recyclable.

Method for Making Dip-Molded Articles:

In the method for making dip-molded latex articles according to the present invention, first, a clean mold having the desired shape of the final article is immersed in a coagulant bath comprising a solution of a metal salt. The coagulant is usually used as a solution in water, an alcohol or a mixture thereof. As specific examples of the coagulant the metal salts can be metal halides like calcium chloride, magnesium chloride, barium chloride, zinc chloride and aluminum chloride; metal nitrates such as calcium nitrate, barium nitrate and zinc nitrate; metal sulfates like calcium sulfate, magnesium sulfate, and aluminum sulfate; and acetic acid salts such as calcium acetate, barium acetate and zinc acetate. Most preferred are calcium chloride and calcium nitrate. The coagulant solution might contain additives to improve the wetting behavior of the former.

Thereafter, the mold is removed from the bath and optionally dried. The such treated mold is then immersed in the compounded latex composition according to the present invention. Thereby, a thin film of latex is coagulated on the surface of the mold. It is known in the art that the thickness of the thus dipped film may be influenced by the concentration of the compounded latex and/or the length of time that the salt-coated mold is in contact with the compounded latex. Alternatively, it is also possible to obtain the latex film by a plurality of dipping steps, particularly two dipping steps in sequence.

Thereafter, the mold is removed from the latex composition and optionally immersed in a water bath in order to extract, for example, polar components from the composition and to wash the coagulated latex film.

Thereafter, the latex coated mold is optionally dried at temperature below 80° C.

Finally, the latex coated mold is heat-treated at a temperature of 40-180° C. in order to obtain the desired mechanical properties for the final film product. Then, the final latex film is removed from the mold. The duration of the heat treatment will depend on the temperature and is typically between 1 and 60 minutes. The higher the temperature, the shorter is the required treatment time.

The inventors of the present invention surprisingly discovered that the dip-molding process can be run more economically when employing the polymer latex of the present invention. Particularly, it was discovered that the duration between forming the compounded latex composition according to the present invention and performing the dip-molding step (maturation time) can be considerably reduced to 180 min or less, compared to compounds made from standard latices that need a maturing time of well above 180 min.

Additionally, the inventors found that the temperature in the heat treatment step can be considerably reduced to be within a range of 40° C. to less than 120° C. without compromising the mechanical properties of the final dip-molded product. Conventional latices require temperature of 120° C. and above to achieve the desired mechanical properties. Thus, when employing the polymer latex of the present invention, the dip-molding process is less time-consuming and less energy-consuming, making it more economical.

According to the present invention, it is therefore preferred that in the compounding step (a)
(i) the polymer latex according to the present invention is compounded by adjusting the pH to a range of 10.5 to 13, preferably 11 to 12, without adding ZnO; or
(ii) a polymer latex comprising the particles of the latex polymer (a) as defined above is compounded by adjusting the pH to a range of 10.5 to 13, preferably 11 to 12, without adding ZnO and by subsequently adding preformed particles of latex polymer (b) as defined above; or
(III) a polymer latex comprising the particles of polymer (b) as defined above is compounded by adjusting pH to a range of 10.5 to 13, preferably 11 to 12, without adding ZnO and by subsequently adding preformed particles of latex polymer (a) as defined above; and the thereby obtained compounded latex composition being free of sulfur vulcanization agents and sulfur vulcanization accelerators and ZnO is matured for less than 180 min, preferably 10 min to 150 min, more preferred 20 min to 120 min, most preferred 30 min to 90 min prior to be employed in the immersing step d); and/or in heat treating step h) the latex-coated mold is heat-treated at a temperature of 40° C. to less than 120° C., preferably 60° C. to 100° C., more preferred 70° C. to 90° C.

The final heat-treated polymer latex film has a tensile strength of at least about 7 MPa and an elongation at break of at least about 300%, preferably a tensile strength of at least about 10 MPa, an elongation at break of at least about 350%, more preferred a tensile strength of at least about 15 MPa and an elongation at break of at least about 400% and even more preferred a tensile strength of at least about 20 MPa and an elongation at break of at least about 500%. These mechanical properties were measured according to ISO37-77 (5th Edition 2011-12-150.

This process can be used for any latex article that can be produced by a dip-molding process known in the art.

The article to be used in the repairing or recycling method according to the present invention may be selected from health care devices formed from elastomeric films or including elastomeric films, surgical gloves, examination gloves, condoms, catheters or all different kinds of industrial and household gloves.

Method for Repairing an Elastomeric Film or Article Comprising Said Elastomeric Film Items formed from an elastomeric film are collected and sorted and optionally sterilized for handling purposes. The items where there is damage, but not to the extent that they cannot be re-used, are separated and the surface where there is damage is optionally further cleaned. This cleansing may be by washing with hydrogen peroxide or other sterilizing fluid or by passing under a carbon dioxide air stream or UV light to make sure there are no pathogens present. In the location of damage, the surfaces of the damaged film that have separated from one another are brought together such that they contact one another, for example if there is a hole the edges of the hole are brought into contact and the surface is heated so that the elastomeric film can soften and the surfaces seal together to repair the damage after which the surface is allowed to cool and reveal a repaired or self-healed surface. The heating may be carried out where pressure is applied to the contacting areas of the damaged surface.

Method for Recycling an Elastomeric Film or Article Comprising Said Elastomeric Film Elastomeric materials such as gloves are collected and if necessary, they are sorted so that the nitrile containing materials are collected together while the other material is discarded or sent to alternative recycling or reprocessing facilities. The collected material is then washed and decontaminated if necessary, much like is done for the repairing/self-healing process. The material is then comminuted into particle sizes of not more than 2 mm average diameter, preferably not more than 1 mm average diameter and ideally of diameters in the range of 0.15 to 0.75, more preferably 0.2 to 0.3 average diameter of the particle size. The comminution or grinding process may be carried out at less than room temperature or indeed under cryogenic conditions to enable facile processing and to keep the material as particles before processing further. The cool conditions avoid any re-joining of the particles until needed. The material may be stored at room temperature, or under such conditions that avoid rejoining of the particles until required. The material may be ground further before being fed to a blender where the material is blended with other materials for example particles of virgin elastomeric material and customary processing aids and additives. If there is no blending step, the material is fed directly to a thermal processing system where the particles/crumb is hot pressed, 2-roll milled, calendered or extruded under pressure and at heated conditions i.e. more than 40 degrees centigrade to allow fluidity in the material until the glass transition temperature is reached for the material and at this stage the material can also be molded into the required final shape. After this the material is cooled, optionally in molds or as part of an extrusion process to produce an end product that is formed from recycled material.

The present invention will be further illustrated with reference to the following examples.

Determination of Physical Parameters:

The dispersions were characterized by determination of total solids content (TSC), pH value, gel content, viscosity (Brookfield LVT) and z-average particle size. Furthermore, the final films were tested for tensile properties.

Determination of Total Solid Contents (TSC):

The determination of total solids content is based on a gravimetric method. 1-2 g of the dispersion was weighed into a tared aluminum dish, on an Analytical balance. The dish was stored for 1 hour at 120° C. in a circulating air oven until constant mass was reached. After cooling to room temperature, the final weight was then re-determined. The solids content was calculated as follows:

$$TSC = \frac{m_{initial} - m_{final}}{m_{initial}} 100\% \quad (1)$$

where, $m_{initial}$=initial mass of latex, $m_{final}$=mass after drying

Determination of pH value:

The pH value was determined according to DIN ISO 976. After applying a 2-point calibration using buffer solutions, the electrode of a Schott CG 840 pH meter was immersed in the dispersion at 23° C. and the constant value on the display was recorded as the pH value.

Determination of Viscosity:

The latex viscosity was determined at 23° C. using a Brookfield LVT viscometer. Approximately 220 ml of the liquid (freed of air bubbles) was filled into a 250 ml beaker and the spindle of the viscometer was immersed up to the mark on the spindle. The viscometer was then switched-on and after approximately 1 minute the value was recorded until it was constant. The viscosity range determines the choice of spindle and rotational speed and the factor for the recorded value to calculate the viscosity. The information regarding spindle and revolutions per minute used are shown in parenthesis in Examples 1, 2 & 8.

Determination of the Particle Size (PS):

The z-average particle size was measured using a Malvern Zetasizer Nano S (ZEN 1600) using dynamic light scattering. The latex sample was diluted with deionized water to the turbidity level described in the manual and transferred in the test cuvette. The cuvette was gently mixed to make the sample homogenous and the cuvette was placed in the measurement device. The value was recorded as software generated z-average particle size.

Dipped Film Preparation:

Nitrile latex with, or without compounding materials at the desired pH value was stirred for 3 hours at room temperature, and then coagulant dipped as follows. A ceramic spade was washed with soap and then thoroughly rinsed with deionized water before drying in an air-circulating oven set at 65-70° C. (spade temperature, 55-60° C.) until dry. A solution of coagulant was prepared by dissolving calcium nitrate (18% wt.) and calcium carbonate (2% wt.) in deionized water. The dry spade was then dipped into the salt solution, removed and then dried in an air-circulating oven set at 70-75° C. (spade temperature, 60-65° C.) until dry. The salt-coated spade was then dipped into the desired, compounded latex (which has total solid content of 18 wt % and matured for 24 hours at room temperature after compounding) for a dwell time of 5 seconds, before removing it and placing the latex-coated spade into an air circulating oven, set at 100° C. for 1 minute, to gel the film.

The thus gelled film was then washed in a tank of deionized water set to 50-60° C. for 1 minute, before curing in an air-circulating oven set to 120° C. for 20 minutes; after which, the thus cured/vulcanized film was cooled, and removed from the spade before aging for 22 hours in an air-circulating oven set to 100° C. Finally, the cured gloves were manually stripped from the spade, a typical dried film thickness was 0.056-0.066 mm. The gloves prepared from the latexes were tested for their tensile strength properties, and stress relaxation behavior.

Determination of the Tensile Strength Properties on Glove Samples:

The tensile properties of the vulcanized or recycled gloves were tested in accordance with ISO37-77 (5$^{th}$ Edition 2011 Dec. 15), the dumbbell specimens were cut from gloves prepared from each latex compound using a Type ISO37-2 cutter (width of narrow portion=4 mm, length of narrow portion=25 mm, overall length=75 mm, the thicknesses of the dumbbells are stated in the results Tables) and tested on a Hounsfield HK10KS Tensiometer fitted with H500LC extensometer, at an extension rate of 500 mm/min.

Preparation of Recycled Glove Films:

The samples for the tensile test were prepared by recombining cut-up samples of the dipped film produced from the original compounded latex, the mixture of small pieces was placed between two polished steel plates before hot pressing at 13.8 MPa (2000 psi) for the number of minutes stated in each Example (typically 5 minutes), and at the temperature stated in each Example (typically 100, 120, 150 or 180° C., before being cooled to room temperature and then dumbbell shaped samples cut out using the cutter specified in ISO37-77 (5$^{th}$ edition, 2011 Dec. 15), Type ISO37-2 die cutter).

Determination of Stress Relaxation Properties:

The stress relaxation properties of the elastomer films were performed on dumbbell specimens cut from the gloves prepared from each latex compound using a ASTM D412 Type C cutter (width of narrow portion=6 mm, length of narrow portion=33 mm, overall length=115 mm, the thicknesses of the dumbbells are stated in the results Tables). The tests were performed on a DMA Q800 Dynamic Mechanical Analyser supplied by TA Instruments, which was operated in the "stress relaxation mode", that is in the tension mode; in which the sample was strained to a value of 1% and the initial stress value recorded ($G_0$). Subsequent stress values were then recorded as a function of time that the sample was held at 1% strain ($G_t$).

The following abbreviations are used in the Examples:
BA=n-butyl acrylate
MAA=Methacrylic acid
Bd=butadiene
ACN=acrylonitrile
GMA=glycidyl methacrylate
tDDM=tert-Dodecyl Mercaptan
Na$_4$EDTA=tetra sodium salt of ethylenediaminetetraacetic acid
tBHP=tertiary butyl hydroperoxide
TSC=total solid content
PS=particle size
ZnO=zinc oxide
ZDEC=zinc diethyldithiocarbamate In the following all parts and percentages are based on weight unless otherwise specified.

EXAMPLES

Example 1: Preparation of Carboxylated Nitrile Latex 2 parts by weight (based on polymer solids) of an oxirane-free seed latex (average particle size 36 nm) and 80 parts by weight of water (based on 100 parts by weight of monomer including the seed latex) were added to a nitrogen-purged autoclave and subsequently heated to 30° C. Then 0.01 parts by weight of Na$_4$EDTA and 0.005 parts by weight of Bruggolite® FF6 dissolved in 2 parts by weight of water were added, followed by 0.08 parts by weight of sodium persulfate dissolved in 2 parts by weight of water. Then, the monomers (35 parts by weight of acrylonitrile, 58 parts by weight of butadiene, 5 parts by weight of methacrylic acid), and were added together with 0.6 parts by weight of tDDM over a period of 4 hours. Over a period of 10 hours 2.2 parts by weight of sodium dodecyl benzene sulfonate, 0.2 parts by weight of tetra sodium pyrophosphate and 22 parts by weight of water were added. The co-activator feed of 0.13 parts by weight of Bruggolite® FF6 in 8 parts by weight of water was added over 9 hours. The temperature was maintained at 30° C. up to a conversion of 95%, resulting in a total solids content of 45%. The polymerization was short-stopped by addition of 0.08 parts by weight of a 5% aqueous solution of diethylhydroxylamine. The pH was adjusted using potassium hydroxide (5% aqueous solution) to pH 7.5 and the residual monomers were removed by vacuum distillation at 60° C. 0.5 parts by weight of a Wingstay L type antioxidant (60% dispersion in water) was added to the raw latex, and the pH was adjusted to 8.2 by addition of a 5% aqueous solution of potassium hydroxide.

The following characterization results were obtained for Example 1:
TSC=44.9 wt. %
pH=8.2
Viscosity=38 mPas (1/60)
Particle size, $P_z$=121 nm Example 2: Preparation of Oxirane-Functional Latex A nitrogen-purged autoclave was charged with 2.0 parts by weight of diphenyl oxide disulfonate dissolved in 185 parts by weight of water relative to 100 parts by weight monomer and heated to a temperature of 70° C. 0.1 parts by weight of tDDM and 0.05 parts by weight of Na4EDTA were added to the initial charge, together with 0.7 parts by weight of ammonium peroxodisulfate (12% solution in water) added in an aliquot addition. Then 45.4 parts by weight of butadiene, 14.6 parts by weight of acrylonitrile and a solution of 5.0 parts by weight of diphenyl oxide disulfonate dissolved in 50 parts by weight of water were added over a period of 6.5 hours. The addition of 40 parts by weight of GMA was started after 1 hour and added over a period of 6.5 hours. After the addition of the monomers the temperature was maintained at 70° C. The polymerization was maintained up to a conversion of 99%. The reaction mixture was cooled to room temperature and sieved through a filter screen (90 µm).

The following characterization results were obtained for Example 2:
TSC=37.7 wt. %
pH=7.1
Viscosity=15 mPas (1/60)
Particle size, $P_z$=39 nm Example 3: (Comparative)

A portion of the oxirane-free XNBR latex, Example 1, was adjusted to a pH value of 10 using an aqueous solution of potassium hydroxide, and compounded with 1 phr zinc oxide, 1 phr titanium dioxide, 0.8 phr of Sulphur and 0.7 phr of ZDEC. The compound was then adjusted to a concentration of 18% wt. solids and stirred for 3 hours.

Example 4

To an aliquot of Example 1 (the oxirane-free XNBR latex) was added an aliquot of Example 2 (the oxirane-functional latex), such that the blending ratio was 90:10 by wet weight of Example 1: Example 2.

Preparation of the Dip Coated Samples

Example 5 (Comparative)

A dry, salt-coated spade was then dipped into the compounded latex solution, Example 3, with a dwell time of 5 seconds before the film was gelled at 100° C. for 1 minute, washed with deionised water for 1 minute (in a tank set at 50-60° C.) for 1 minutes, followed by drying and curing/vulcanisation in an air-circulating oven set at 120° C. for 20 minutes, to ensure complete drying and crosslink formation.

Example 6

The blend of Example 4 was adjusted to a pH value of 10 using a solution of potassium hydroxide and the blend stirred for 3 hours before it was dipped with a dry, salt-coated spade and processed in accordance with the protocol given in Example 5.

Example 7

The blend of Example 4 was adjusted to a pH value of 10.0 using a solution of potassium hydroxide and compounded with zinc oxide (1 phr), the blend was then stirred for 3 hours before it was dipped with a dry, salt-coated spade and processed in accordance with the protocol given in Example 5.

Example 8

The blend of Example 4 was adjusted to a pH value of 11.5 using a solution of potassium hydroxide and the blend was then stirred for 3 hours before it was dipped with a dry, salt-coated spade and processed in accordance with the protocol given in Example 5.

Stress Relaxation Experiments

The stress relaxation of a number of samples was tested as a function of time, the samples were prepared according to "Dipped film preparation" section described above.

Example 9

A dried and cured film obtained from Example 5 (comparative) was then cut in to a number of dumbbell shaped samples (25±0.8 mm in length, 6 mm in width, and 0.056-0.066 mm thick) using a pre-shaped cutter (see FIG. 1).

Figure 2:
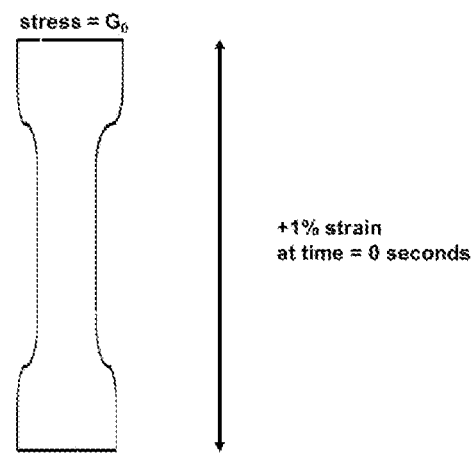
FIG. 2 illustrates equilibration of a cast film from Examples 9, 20 and 22 at the test temperature for 5 minutes before being strained to 1%, where the initial stress value was recorded as $G_0$.
Figure 3:
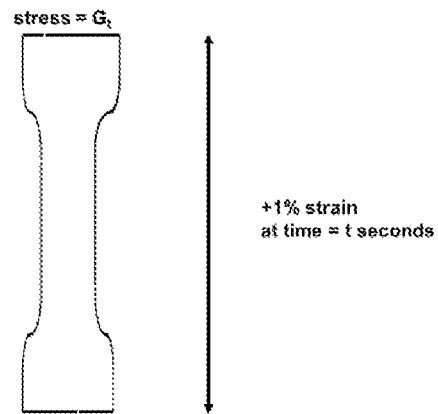
FIG. 3 illustrates stress value at 1% strain monitored as a function of time at the required test temperature ($G_t$) in Examples 9, 20 and 22.

The dumbbell was then clamped into the jaws of the DMA Q800 Dynamic Mechanical Analyser supplied by TA Instruments, and the sample allowed to equilibrate at the test temperature for 5 minutes before being strained to 1%, and the initial stress value was recorded as $G_0$ (see FIG. 2). Maintaining the strain at 1%, the stress value was then monitored as a function of time at the required test temperature ($G_t$), typically for 1200 seconds (see FIG. 3).

Typical test temperatures chosen were 100, 120, 150 & 180° C.

The stress relaxation was defined as follows, $$\text{Stress relation} = G_t/G_0$$

Figure 4:
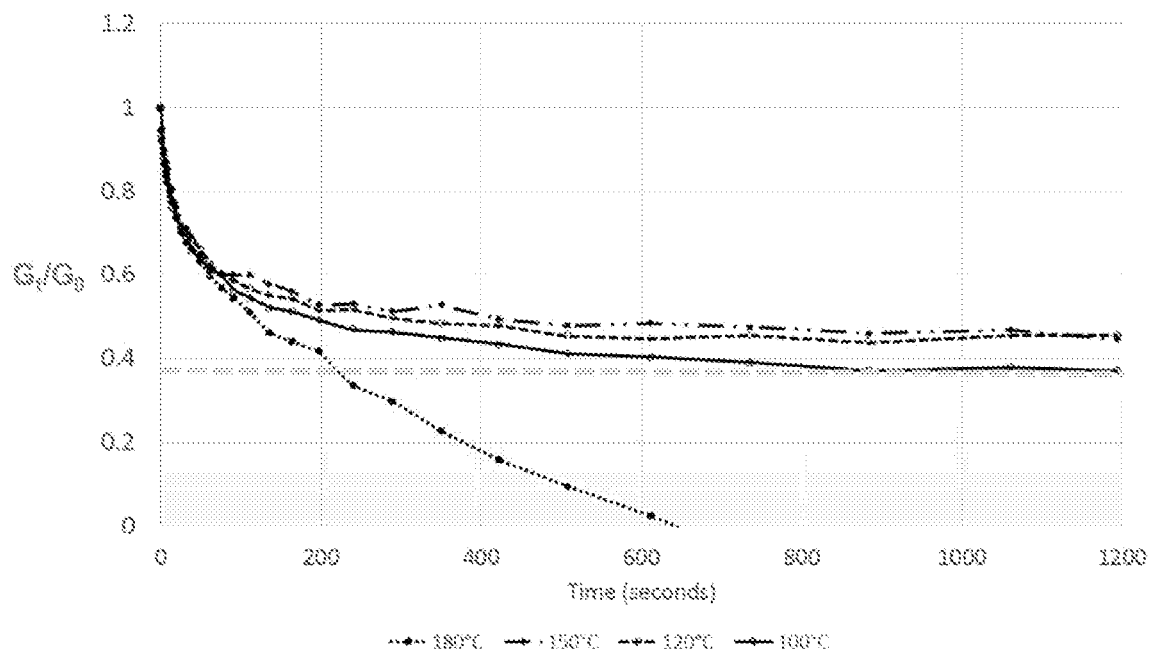
FIG. 4 illustrates the results obtained in Example 9.

The results obtained for Example 9 are shown in FIG. 4, the thickness of the test piece is shown in parenthesis on the plot; it should be noted that a line has been drawn at a value of $G_t/G_0 = 1/e$ (=0.63)

Reference: http://web.mit.edu/course/3/3.11/www/modules/visco.pdf

The time elapsed for the stress to reach a value of 1/e is tabulated below, in Table 1. The stress relaxation values for 120 and 100° C., did not fall below the 1/e value Example 10

Figure 5:
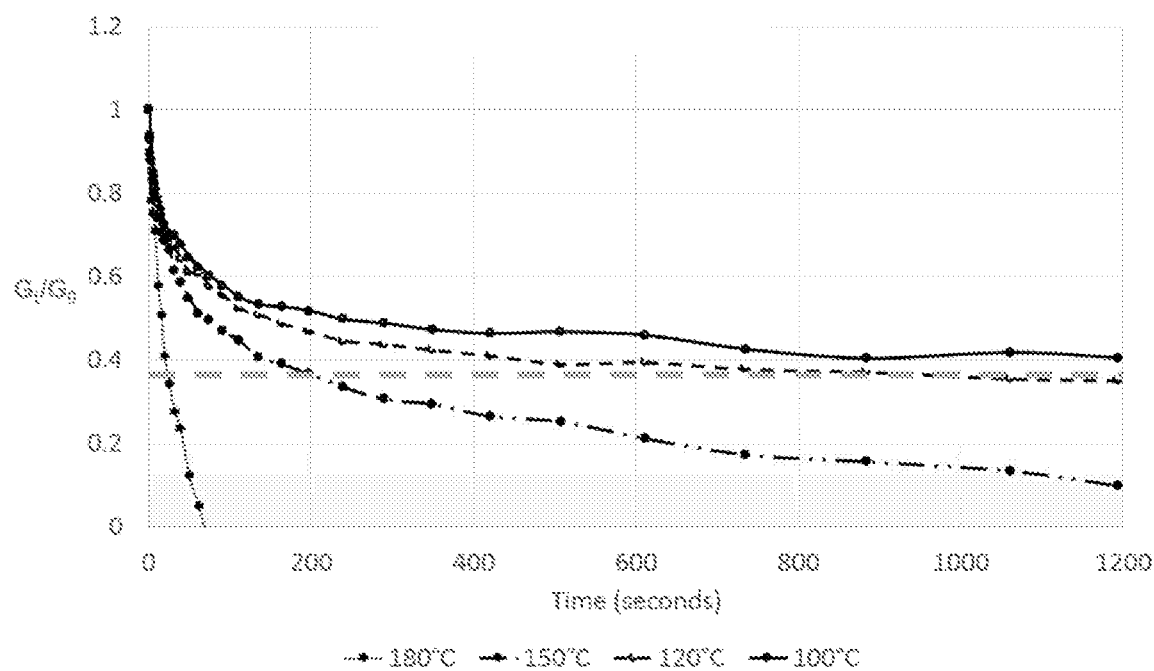
FIG. 5 illustrates the results obtained in Example 10.

This was an exact repeat of Example 9, except that Example 6 replaced Example 5; the results are shown in FIG. 5, and Table 1.

The result for the stress relaxation experiments is given in FIG. 5, and Table 3

This data showed that the data for 100° C. did not fall below the 1/e value; in addition, in contrast to Example 9, the data followed a trend of descending temperature.

Example 11

Figure 6:
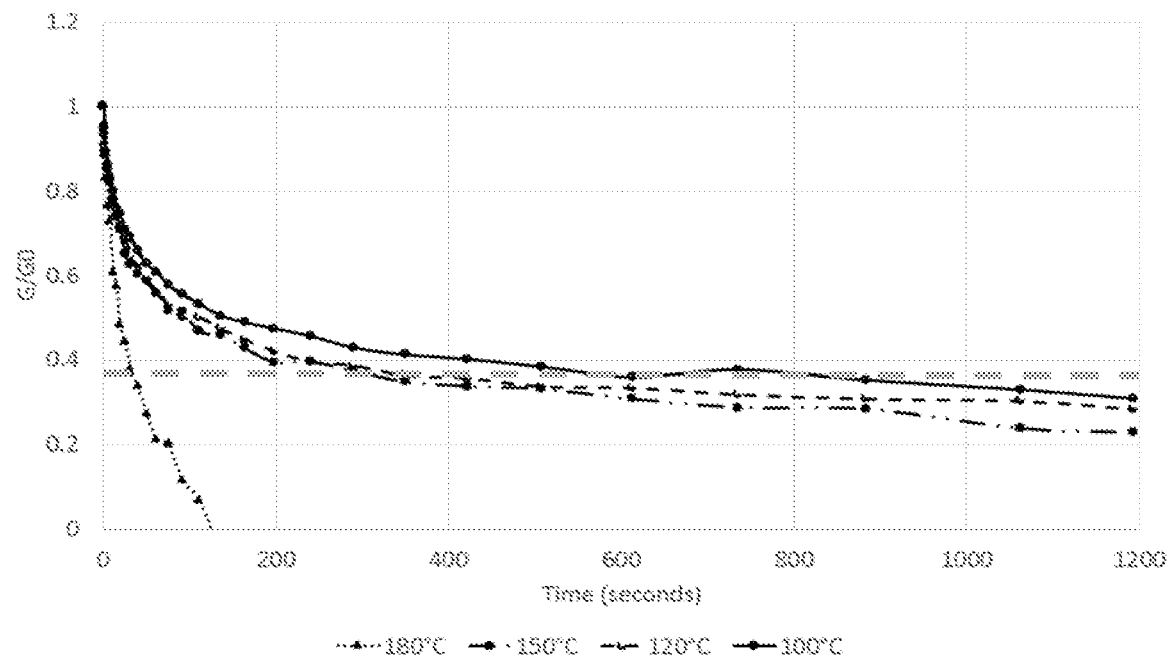
FIG. 6 illustrates the results obtained in Example 11.

This was an exact repeat of Example 9, except that Example 8 replaced Example 5; the results are shown in FIG. 6, and Table 1.

This data showed that for a zinc oxide-free elastomeric system compounded to pH 11.5, the rate of change of the stress relaxation values decreased in the order of 180>>150>120>100° C., and all data sets reached the 1/e value.

TABLE 1

| Compounded latex | Time to $G_t/G_0$ = 1/e (s) @ 180° C. | Time to $G_t/G_0$ = 1/e (s) @ 150° C. | Time to $G_t/G_0$ = 1/e (s) @ 120° C. | Time to $G_t/G_0$ = 1/e (s) @ 100° C. |
|---|---|---|---|---|
| Example 9 (comparative) | 220 | 883 | N/A | N/A |
| Example 10 | 24 | 200 | 883 | N/A |
| Example 11 | 30 | 340 | 340 | 600 |

This data is indicative for the re-processability of an elastomeric film made in accordance of the present invention. It is believed that this data can be interpreted that in the inventive examples compared to the comparative examples the cross-links break up and the polymer system then can move on the microscopic scale to relax the applied stress. This effect is more pronounced at higher temperatures. The elastomeric film made without ZnO shows this effect also at lower temperatures. This result is evidence for the self-healing properties of the elastomeric film described herein.

Recycling of the Elastomeric Films

A number of elastomeric films were recycled and the tensile strength values for the initial elastomeric films were compared with the tensile strength values for the recycled films.

Example 12: (Comparative) and 13-15

The samples for the tensile test were cut from a film prepared in accordance with Example 5-8, using a Type 2 dumbbell cutter die, as specified in ISO37 (5th edition, 2011 Dec. 15). The ends of the dumbbell were placed in the jaws of the Hounsfield HK10KS Tensiometer fitted with an H500LC extensometer and subjected to strain rate of 500 mm per minute. The value for the stress was reported automatically by the machine software, as was the modulus value at a given strain (typically 100, 300 and 500% strain). The results are reported in Table 2.

TABLE 2

| Starting compound | | | | | ISO37-77 | | |
|---|---|---|---|---|---|---|---|
| | | Thickness | Tensile strength | Elongation at break | Modulus (MPa) | | |
| Example | Example | (mm) | (MPa) | (%) | 100 | 300 | 500 |
| 5 | 12 | 0.052 | 42.4 | 546 | 3.4 | 8.0 | 31.0 |
| 6 | 13 | 0.049 | 34.0 | 588 | 2.3 | 5.5 | 18.7 |
| 8 | 14 | 0.049 | 42.2 | 557 | 3.1 | 7.5 | 28.1 |
| 7 | 15 | 0.056 | 38.8 | 548 | 3.3 | 8.0 | 29.8 |

Recycling of the Elastomeric Films

Herein, an elastomer film being recyclable is defined as one which upon being cut up into small pieces can be recombined upon subjecting the pieces to a low temperature, typically less than 100° C. for 1 minute, or preferably at 80° C. for 5 minutes, under an applied pressure of 13.8 MPa (2000 psi); which then demonstrates an elongation at break in excess of 90%, and a tensile strength of greater than 1.5 MPa in accordance with the following test protocols.

Example 16: (Comparative)

The samples for the tensile test were prepared by re-combining cut-up samples of the dipped film produced from the compounded latex, Example 5 (comparative), (the original film being prepared in accordance with the protocol of Example 5), the mixture of small pieces was annealed between two polished steel plates before hot pressing at 13.8 MPa (2000 psi) for 1 minute and 100° C., before being cooled to room temperature and then dumbbell shaped samples were cut out using the Type 2 die cutter specified in ISO37 (5th edition, 2011 Dec. 15. The ends of the dumbbell were placed in the jaws of the Hounsfield HK10KS Tensiometer fitted with an H500LC extensometer and subjected to strain rate of 500 mm per minute. The value for the stress was reported automatically by the machine software, as was the modulus value at a given strain (typically 100, 300 and 500% strain). The results are reported in Table 3.

Example 17

This was an exact repeat of Example 16, except that Example 6 replaced Example 5; the results are reported in Table 3.

Example 18: (Comparative)

This was an exact repeat of Example 16, except that the dumbbell sample was annealed at 13.8 MPa (2000 psi) and 80° C. for 5 minutes, cooled to room temperature and the ends of the dumbbell were placed in the jaws of the Hounsfield HK10KS Tensiometer fitted with an H500LC extensometer, and subjected to strain rate of 500 mm/min. The value for the stress was reported automatically by the machine software, as was the modulus value at a given strain (typically 100, 300 and 500% strain). The results are reported in Table 3.

Example 19

This was an exact repeat of Example 18, except that Example 6 replaced Example 3; the results are shown in Table 5.

Example 20

This was an exact repeat of Example 18, except that Example 8 replaced Example 5; the results are shown in Table 3.

TABLE 3

| Starting compound Example | Patent Example | Thickness (mm) | ISO37-77 Tensile Strength (MPa) | Elongation at break (%) | Modulus (MPa) 100 | 300 | 500 |
|---|---|---|---|---|---|---|---|
| 5 | 16 | 1.230 | 1.4 | 45 | F | F | F |
| 6 | 17 | 0.646 | 3.6 | 201 | 2.1 | F | F |
| 5 | 18 | 0.757 | 0.8 | 18 | F | F | F |
| 6 | 19 | 0.829 | 3.1 | 220 | 1.7 | F | F |
| 8 | 20 | 1.030 | 4.0 | 139 | 3.2 | F | F |

Where F = failure/rupture of the sample

Table 3 shows that both of the comparative Examples (16 & 18) failed (dumbbells ruptured) at less than 100% strain and all showed a tensile strength of less than 1.5 MPa and an elongation at break of less than 90 strain; therefore, the comparative examples did not demonstrate the ability to self-heal at the annealing temperature used.

The Examples 17 & 19 (no zinc oxide, pH 10.0) demonstrated a tensile strength in excess of 3 MPa and an elongation at break above 200%, after annealing at 100° C. for 1 minute, or 80° C. for 5 minutes. That is, the films produced from these dipped gloves were recyclable films.

Example 20 demonstrated that increasing the pH to 11.5 increased the tensile strength and the modulus, though the elongation at break was reduced to 139%. That is, the film produced from this dipped glove was a recyclable film.

Determination of Tensile Properties after Repairing an Elastomeric Film:

Nitrile latex with, or without compounding materials at the desired pH value was stirred for 3 hours at room temperature, and then cast on to a petri dish.

The cast latex film on the surface of the petri dish was then placed in a circulating air oven at 25° C. for three days. The obtained films were then annealed in an air circulating oven at 90° C. for 24 hours to ensure complete drying and any desired crosslink formation to occur.

The cast film was carefully removed from the glass petri dish and cut into dumbbell shapes using a 3 mm 'D'-type cutter (see FIG. 1). One dumbbell was left uncut (to act as a control sample), whilst another was cut into halves at the middle point of the dumbbell (see FIG. 2). If required, the upper surface of each of the cut halves was marked for reference. The freshly cut surfaces of the dumbbells were then immediately pressed together for 60 seconds (see FIG. 3) while the cut pieces were placed on a glass plate, and then these rejoined pieces on the glass plate were placed in an air circulating oven at 180° C. for 30 minutes (to simulate a non-pressure dry rubber hot treatment process). Alternatively, the freshly cut surfaces of the dumbbells were then immediately pressed together for 60 seconds and the pressure maintained by placing the 'jaws' of a wooden peg over the rejoined sections, followed by heat treatment in an oven at 180° C. for 30 minutes. This was intended to simulate a low-pressure dry rubber hot press process.

Example 21 (Comparative)

A portion of the oxirane-free XNBR latex, Example 1, was adjusted to a pH value of 10 using an aqueous solution of potassium hydroxide, and compounded with 1 phr zinc oxide, 0.8 phr of Sulphur and 0.7 phr of ZDEC. The compound was then stirred for 3 hours and then cast on to a glass petri dish and allowed to dry at room temperature (25° C.) for 3 days. The obtained film was removed from the glass petri dish and annealed in an oven at 90° C. for 24 hours to ensure complete drying and crosslink formation.

Wherein a film which was cut into 2 halves and subsequently the 2 halves were then held together was capable of demonstrating a tensile strength when the thus joined 2 halves were subsequently separated, was said to be self-healing.

The two dumbbell samples (cut-and-rejointed and uncut) were then subjected to stress-strain analysis to determine the tensile properties of the elastomer before and after being cut-and-rejointed. That is, to determine the extent of self-healing of the cut film. The tensile properties were tested in accordance with ASTM D412-06a, using a 3 mm, type 'D' dumbbell specimen for tensile tests, with a typical film thickness of 1.0-1.4 mm±0.01 cut from the cast latex film. The film thickness (mm) was measured using a thickness gauge (supplied by Sylvac, model, Studenroth, type 12.5 mm/0.001).

A Zwick Roell Z005 TN Proline tensiometer fitted with a long stroke extensometer was used to record the tensile stress-elongation curves. The samples were extended at a rate of 500 mm/minute, at a temperature of 23±2° C., and a relative humidity 50±5%. The Tensile Strength data reported here corresponds to the observed maximum tensile stress whilst elongating the dumbbell to rupture. The reported Ultimate Elongation value corresponds to the elongation at which rupture occurred. The reported Modulus values, $M_{100}$, $M_{300}$ and $M_{500}$, correspond to the stress required to reach an elongation of 100%, 300% or 500% of the original length, respectively.

Preparation of Dumbbell Samples, and Comparison of Uncut and Self-Healed Samples:

Example 22

A dried and cured film obtained from Example 21 was then cut in to a number of dumbbell samples using a 'D' cutter (see FIG. 1). One dumbbell remained uncut whilst another was cut into halves using a sharp blade applied to the narrow section of the dumbbell (see FIG. 2). The cut dumbbell was then immediately re-joined by holding the cut surfaces together and manually pressed together for 60 seconds (See FIG. 3). The thus rejoined dumbbell was then annealed in an air-circulating oven, maintained at 180° C., for 30 minutes. The self-healed dumbbell was then subjected to a tensile test in order to determine the extent of recovery of the tensile properties by comparison to the results obtained for the uncut dumbbell obtained from the same cast film.

Figure 7:
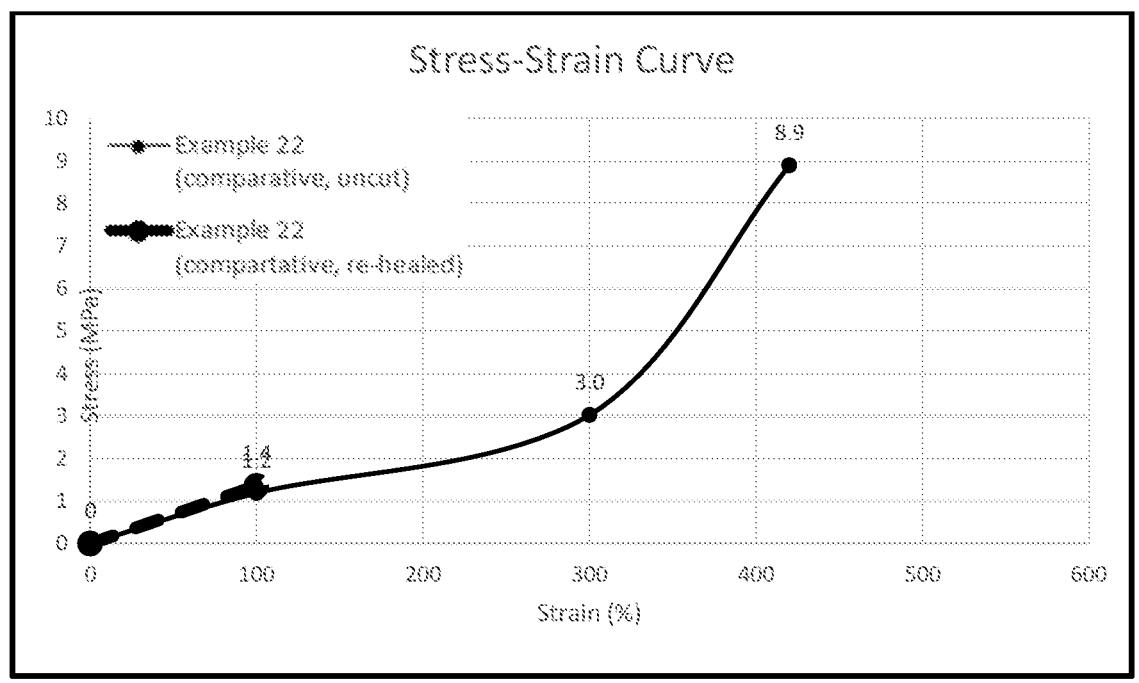
FIG. 7 illustrates the stress-strain curve results obtained in Example 22.

The results are shown in Table 4 and FIG. 7.

Example 23

To an aliquot of Example 1 (the oxirane-free XNBR latex) was added an aliquot of Example 2 (the oxirane-functional latex), such that the blending ratio was 90:10 by weight wet of Example 1: Example 2. The blend was adjusted to a pH value of 10 using a solution of potassium hydroxide and stirred for 3 hours and then cast on to a glass petri dish and allowed to dry at room temperature (25° C.) for 3 days. The obtained film was removed from the glass petri dish and annealed in an oven at 90° C. for 24 hours to ensure complete drying and crosslink formation. The film was then cut into dumbbells and tested, as per Example 22.

Figure 8:
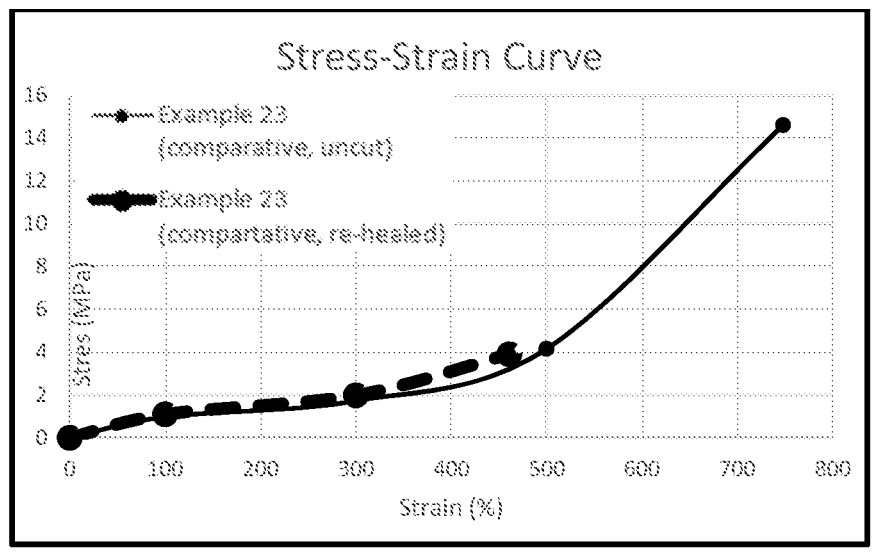
FIG. 8 illustrates the stress-strain curve results obtained in Example 23.

The results are shown in Table 4 and FIG. 8.

Example 24

This was a repeat of Example 23, except that 1 phr zinc oxide was added to the latex, at pH 10, and stirred for 3 hours before casting. The film was then cut into dumbbells and tested, as per Example 22.

Figure 9:
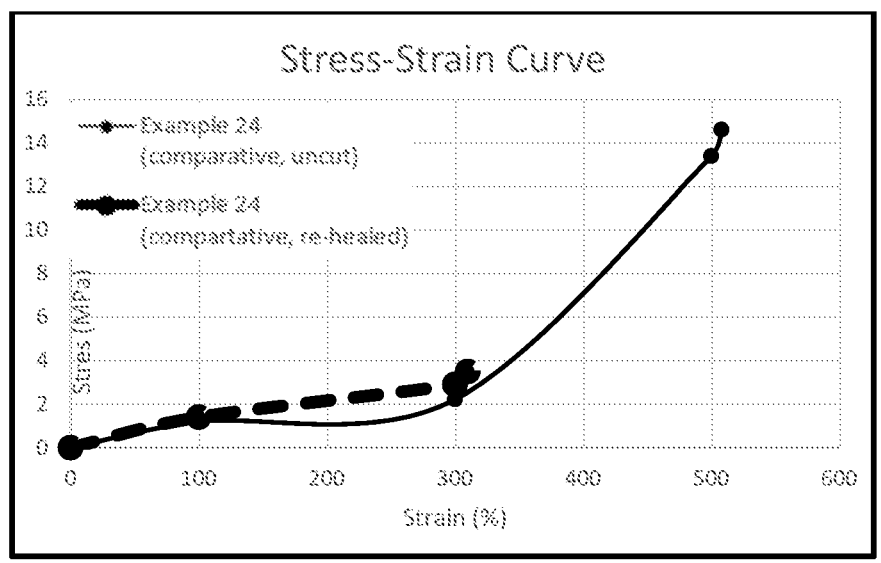
FIG. 9 illustrates the stress-strain curve results obtained in Example 24.

The results are shown in Table 4 and FIG. 9.

Example 25

This was a repeat of Example 23, except that the pH value was adjusted to 11.5. The film was then cut into dumbbells and tested, as per Example 22.

Figure 10:
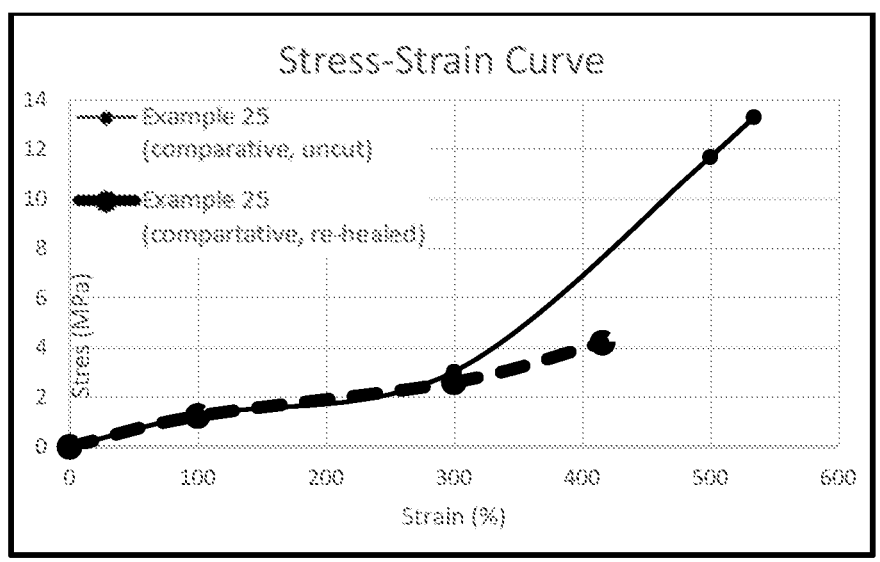
FIG. 10 illustrates the stress-strain curve results obtained in Example 25.

The results are shown in Table 4 and FIG. 10.

TABLE 4

|  | Example 22 (comp.) | Example 23 | Example 24 | Example 25 |
| --- | --- | --- | --- | --- |
| Example 1 (wt. %) | 100 | 90 | 90 | 90 |
| Example 2 (wt. %) | 0 | 10 | 10 | 10 |
| Compounding conditions | With ZnO, S and ZDEC, pH 10 | No ZnO, S or ZDEC, pH 10 | With ZnO, but no S or ZDEC, pH 10 | No ZnO, S or ZDEC, pH 11.5 |
| Thickness of film (mm) | 1.3 | 1.2 | 1.4 | 1.0 |
| A: Original tensile strength (MPa) of uncut dumbbell | 8.9 | 14.6 | 14.6 | 13.3 |
| B: Tensile strength after self-healing (MPa) | 1.4 | 3.9 | 3.5 | 4.2 |
| C: Original elongation at break (%) of uncut | 420 | 748 | 508 | 534 |
| D: Elongation at break after self-healing (%) | 101 | 461 | 310 | 416 |
| Retention of tensile strength (B/A, %) | 16 | 27 | 24 | 32 |
| Retention of elongation at break (D/C, %) | 24 | 62 | 61 | 78 |

Example 26

To an aliquot of Example 1 (the oxirane-free XNBR latex) was added an aliquot of Example 2 (the oxirane-functional latex), such that the blending ratio was 90:10 by weight wet of Example 1: Example 2.

The blend was adjusted to a pH value of 5 using an aqueous solution of potassium hydroxide and stirred for 3 hours and then cast on to a glass petri dish and allowed to dry at room temperature (25° C.) for 3 days. The obtained film was removed from the glass plate and annealed in an oven at 90° C. for 24 hours to ensure complete drying and crosslink formation. The dried and cured film was then cut in to a number of dumbbell samples using a 'D' cutter. One dumbbell remained uncut whilst another was cut into halves using a sharp blade applied to the narrow section of the dumbbell. The cut dumbbell was then immediately re-joined by holding the cut surfaces together and manually pressed together for 60 seconds, this was immediately followed by the application of the jaws of a wooden clothes peg to maintain the intimate contact of the 2 surfaces as the thus rejoined dumbbell was annealed in an air-circulating oven, maintained at 180° C., for 30 minutes. The results are shown in Table 5.

Example 27

This was a repeat of Example 26 except that the pH value was adjusted to 10.
The results are shown in Table 5.

Example 28

This was a repeat of Example 26, except that the pH value was adjusted to 11.
The results are shown in Table 5.

Example 29

This was a repeat of Example 26, except that the pH value was adjusted to 11.5.
The results are shown in Table 5.

TABLE 5

|  | Example 26 | Example 27 | Example 28 | Example 29 |
|---|---|---|---|---|
| Example 1 | 90 | 90 | 90 | 90 |
| Example 2 | 10 | 10 | 10 | 10 |
| Compounding conditions | No ZnO, S or ZDEC, pH 5 | No ZnO, S or ZDEC, pH 10 | No ZnO, S or ZDEC, pH 11 | No ZnO, S or ZDEC, pH 11.5 |
| Thickness (mm) | 1.1 | 1.0 | 0.8 | 1.2 |
| A: Original tensile strength (MPa) of uncut | 5.6 | 5.8 | 5.2 | 3.7 |
| B: Tensile strength after re-healing (MPa) | 2.8 | 3.4 | 3.1 | 3.5 |
| C: Original elongation at break (%) of uncut | 1424 | 597 | 506 | 461 |
| D: Elongation at break after re-healing (%) | 510 | 540 | 405 | 374 |
| Retention of tensile strength (B/A %) | 50 | 59 | 60 | 95 |
| Retention of elongation at break (D/C %) | 36 | 90 | 80 | 81 |

The invention claimed is:

1. A method for repairing an elastomeric film or an article comprising the elastomeric film by
   a) providing a damaged elastomeric film or article comprising a damaged elastomeric film, the damaged elastomeric film having at least surfaces to be reconnected,
   b) re-joining the surfaces of the damaged film, and
   c) heating or annealing the damaged elastomeric film while maintaining intimate contact of the rejoined surfaces of the damaged film at a temperature of 40° C. to 200° C., wherein the elastomeric film is made from a polymer latex comprising:
   (a) particles of a carboxylated conjugated diene nitrile latex polymer (a) obtainable by free-radical emulsion polymerization of a mixture of ethylenically unsaturated monomers comprising:
   15 to 99 wt.-% of conjugated dienes;
   1 to 80 wt.-% of monomers selected from ethylenically unsaturated nitrile compounds;
   0.05 to 10 wt.-% of ethylenically unsaturated carboxylic acids and/or salts thereof;
   0 to 50 wt.-% of vinyl aromatic monomers; and
   0 to 65 wt.-% of alkyl esters of ethylenically unsaturated acids,
   the weight percentages being based on the total monomers in the mixture in combination or association with
   (b) particles of a latex polymer (b) comprising at least one oxirane-functional group,
   wherein the monomer composition of the latex polymer (a) is different from the monomer composition of the latex polymer (b).

2. The method of claim 1, wherein the damage is selected from pinholes, cuts, ruptures and complete separation of the elastomeric film in at least two parts.

3. The method of claim 1, wherein the temperature is 60° C. to 200° C.

4. The method according to claim 1, wherein:
   a) the conjugated dienes are selected from butadiene, isoprene, 2,3-dimethyl-1,3-butadiene, 2-ethyl-1,3-butadiene, 1,3-pentadiene, myrcene, ocimene, farnasene and combinations thereof;
   b) the ethylenically unsaturated nitrile compounds are selected from (meth) acrylonitrile, alpha-cyanoethyl acrylonitrile, fumaronitrile, alpha-chloronitrile and combinations thereof;
   c) the ethylenically unsaturated carboxylic acids and salts thereof are selected from mono carboxylic acids, ethylenically unsaturated polycarboxylic acid, anhydrides and salts thereof, and polycarboxylic acid partial esters and salts thereof;
   d) the vinyl aromatic monomers are selected from styrene, alpha-methyl styrene, vinyl toluene and combinations thereof;
   e) the alkyl esters of ethylenically unsaturated acids are selected from methyl (meth)acrylate, ethyl (meth)acrylate, propyl (meth)acrylate, iso-propyl methacylate, n-butyl (meth)acrylate, isobutyl methacrylate, tert-butyl methacrylate, 2-ethylhexyl (meth)acrylate, octyl (meth)acrylate and combinations thereof;
   the mixture of ethylenically unsaturated monomers for latex polymer (I) optionally comprises ethylenically unsaturated monomers selected from
   f) hydroxyalkyl esters of ethylenically unsaturated acids;
   g) amides of ethylenically unsaturated acids;
   h) vinyl carboxylates;
   i) monomers having at least two ethylenically unsaturated groups;
   j) ethylenically unsaturated silanes; and combinations thereof.

5. The method of claim 1, wherein the mixture of ethylenically unsaturated monomers for latex polymer (a) comprises:
   20 to 99 wt.-% of conjugated dienes;
   1 to 60 wt.-% of monomers selected from ethylenically unsaturated nitrile compounds;
   0 to 40 wt.-% of vinyl aromatic monomers;
   0 to 25 wt.-% of $C_1$ to $C_8$ alkyl (meth) acrylates;
   0.05 to 7 wt.-% of ethylenically unsaturated acids;
   0 to 10 wt.-% of vinyl esters:
   0 to 10 wt.-% of ethylenically unsaturated compounds bearing silane, amide and/or N-methylolamide groups,
   the weight percentages being based on the total monomers in the mixture.

6. The method of claim 1, wherein the oxirane-functional latex polymer (b) comprises structural units derived from ethylenically unsaturated oxirane-functional monomers in an amount of 1 to 80 wt.-% based on the total weight of monomers for the oxirane-functional latex particles (b), wherein the oxirane-functional latex polymer (b) comprises:

structural units derived from oxirane-functional ethylenically unsaturated monomers selected from glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl) acrylate, (6',7'-epoxyheptyl) methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate and combinations thereof;

structural units of one or more monomers selected from ethylenically unsaturated nitrile compounds selected from (meth) acrylonitrile, alpha-cyanoethyl acrylonitrile, fumaronitrile and combinations thereof;

vinyl aromatic monomers;

alkyl esters of ethylenically unsaturated acids;

hydroxyalkyl esters of ethylenically unsaturated acids;

amides of ethylenically unsaturated acids;

ethylenically unsaturated acids;

vinyl carboxylates;

conjugated dienes;

monomers having at least two ethylenically unsaturated groups; and combinations thereof.

7. The method of claim 1, wherein the oxirane-functional latex polymer (b) comprises structural units derived from (I) 0 to 50 wt.-% of monomers selected from ethylenically unsaturated nitrile compounds;

0 to 95 wt.-% of vinyl aromatic monomers;

0 to 95 wt.-% of $C_1$ to $C_8$ alkyl (meth) acrylates;

0 to 10 wt.-% of ethylenically unsaturated acids;

0 to 10 wt.-% of ethylenically unsaturated compounds bearing silane, sulfonate, sulfonic acid, amide and/or N-methylolamide groups;

0 to 50 wt.-% of vinyl carboxylates; and 1 to 80 wt.-% of structural units derived from ethylenically unsaturated oxirane-functional monomers; or (II) 2 to 95 wt.-% of conjugated dienes;

1 to 50 wt.-% of monomers selected from ethylenically unsaturated nitrile compounds;

0 to 95 wt.-% of vinyl aromatic monomers;

0 to 95 wt.-% of $C_1$ to $C_8$ alkyl (meth) acrylates;

0 to 10 wt.-% of ethylenically unsaturated acids;

0 to 10 wt.-% of ethylenically unsaturated compounds bearing silane, sulfonate, sulfonic acid, amide and/or N-methylolamide groups;

1 to 80 wt.-% of structural units derived from ethylenically unsaturated oxirane-functional monomers.

8. The method of claim 1, wherein for making the polymer latex:

(i) the mixture of ethylenically unsaturated monomers for latex polymer (a) is polymerized in presence of particles of the oxirane-functional latex polymer (b) in the free-radical emulsion polymerization, wherein the particles of the oxirane-functional latex polymer (b) are present in an amount of 0.01 to 10 parts by weight based on 100 parts by weight of total ethylenically unsaturated monomers in the polymer latex including those for making the oxirane-functional latex polymer (b); or (ii) wherein a polymer latex comprising the particles of latex polymer (a) and a polymer latex comprising the particles of latex polymer (b) are preformed and subsequently both latices are combined; or (iii) the mixture of ethylenically unsaturated monomers for latex polymer (a) is polymerized in presence of particles the oxirane-functional latex polymer (b) in the free-radical emulsion polymerization forming a first polymer latex, and a second polymer latex comprising the particles of latex polymer (b) is preformed and subsequently both latices are combined, wherein the latex comprising the oxirane-functional latex particles (b) for making the first polymer latex and the second polymer latex comprising the particles of latex polymer (b) are the same or are different.

9. The method of claim 1, wherein the z-average particle size measured with a Malvern zetasizer nano S (ZEN 1600) using dynamic light scattering of the oxirane-functional latex particles (b) is 5 to 90 nm.

10. The method of claim 1, wherein the elastomeric film or article comprising the elastomeric film is made from a compounded latex composition comprising the polymer latex that is free of sulfur vulcanization agents and accelerators for sulfur vulcanization and optionally possesses one or more of the following properties:

the compounded latex composition is free of ZnO;

the compounded latex composition has a pH of 10.5 to 13.

11. The method of claim 10, wherein the article is made by a dip-molding process comprising:

a) providing the compounded latex composition;

b) immersing a mold having the desired shape of the final article in a coagulant bath comprising a solution of a metal salt;

c) removing the mold from the coagulant bath and optionally drying the mold;

d) immersing the mold as treated in step b) and c) in the compounded latex composition of step a);

e) coagulating a latex film on the surface of the mold;

f) removing the latex-coated mold from the compounded latex composition and optionally immersing the latex-coated mold in a water bath;

g) optionally drying the latex-coated mold;

h) heat treating the latex-coated mold obtained from step e) or f) at a temperature of 40° C. to 180° C.; and i) removing the latex article from the mold.

12. The method of claim 1, wherein the article comprising the elastomeric film is selected from surgical gloves, examination gloves, condoms, catheters, industrial gloves, textile-supported gloves and household gloves.

* * * * *

UNITED STATES PATENT AND TRADEMARK OFFICE
CERTIFICATE OF CORRECTION

| | | |
|---|---|---|
| PATENT NO. | : 12,365,153 B2 | Page 1 of 1 |
| APPLICATION NO. | : 17/610039 | |
| DATED | : July 22, 2025 | |
| INVENTOR(S) | : Zhenli Wei and Yi-Fan Goh | |

It is certified that error appears in the above-identified patent and that said Letters Patent is hereby corrected as shown below:

In the Claims

In Column 34, Line 35 of Claim 4, part (e): delete "iso-propyl methacylate" and insert -- iso-propyl methacrylate --

Signed and Sealed this
Twenty-third Day of September, 2025

John A. Squires
*Director of the United States Patent and Trademark Office*